(12) United States Patent
Nakanuma

(10) Patent No.: US 8,199,614 B2
(45) Date of Patent: Jun. 12, 2012

(54) ABERRATION CORRECTION ELEMENT FOR USE IN READING AND WRITING DATA ON MULTIPLE TYPES OF OPTICAL RECORDING MEDIA

(75) Inventor: Hiroshi Nakanuma, Yokohama (JP)

(73) Assignee: Ricoh Company, Ltd., Tokyo (JP)

(*) Notice: Subject to any disclaimer, the term of this patent is extended or adjusted under 35 U.S.C. 154(b) by 103 days.

(21) Appl. No.: 12/554,080

(22) Filed: Sep. 4, 2009

(65) Prior Publication Data
US 2009/0323482 A1 Dec. 31, 2009

(30) Foreign Application Priority Data
Sep. 5, 2008 (JP) .................. 2008-228188

(51) Int. Cl.
*G11B 7/00* (2006.01)
*G11B 7/135* (2012.01)
(52) U.S. Cl. .................. 369/44.23; 369/112.05
(58) Field of Classification Search .......... None
See application file for complete search history.

(56) References Cited

U.S. PATENT DOCUMENTS

| | | | |
|---|---|---|---|
| 7,450,486 B2 | 11/2008 | Hirai | |
| 2002/0060846 A1* | 5/2002 | Hayashi et al. | 359/569 |
| 2004/0257958 A1* | 12/2004 | Kimura et al. | 369/112.03 |
| 2005/0249064 A1* | 11/2005 | Kimura et al. | 369/44.37 |
| 2005/0265151 A1* | 12/2005 | Kimura et al. | 369/44.37 |
| 2008/0068939 A1* | 3/2008 | Tanaka et al. | 369/44.14 |
| 2009/0097381 A1* | 4/2009 | Hamano et al. | 369/112.04 |
| 2010/0157777 A1* | 6/2010 | Mizuno | 369/112.05 |

FOREIGN PATENT DOCUMENTS

| | | |
|---|---|---|
| JP | 2003-518637 | 6/2003 |
| JP | 2005-209299 | 8/2005 |
| JP | 2005-339718 | 12/2005 |
| JP | 2006-92720 | 6/2006 |
| WO | WO01/48746 A1 | 7/2001 |
| WO | WO 2007123250 A1 * | 11/2007 |

* cited by examiner

*Primary Examiner* — Peter Vincent Agustin
*Assistant Examiner* — Mark Fischer
(74) *Attorney, Agent, or Firm* — Cooper & Dunham LLP

(57) ABSTRACT

An aberration correction element including a diffraction plane that corrects a spherical aberration caused by the difference among a first optical recording medium, a second optical recording medium, and a third recording medium by transmitting first beams of light having a wavelength of $\lambda 1$ emitted from a first light source to read and write data on the first recording medium, and diffracting second beams of light having a wavelength of $\lambda 2$ emitted from a second light source to read and write data on the second recording medium, and third beams of light having a wavelength of $\lambda 3$ emitted from a third light source to read and write data on the third recording medium; and a phase shifter plane generating a spherical aberration $-\Delta SA$ having a reverse direction to a spherical aberration $\Delta SA$ generated at an objective lens optimized for the first optical recording medium according to a temperature change.

1 Claim, 15 Drawing Sheets

BD (ZERO) : 84%

DVD (+PRIMARY) : 73%

CD (ZERO) : 78%
CD (-SECONDARY) : 0%

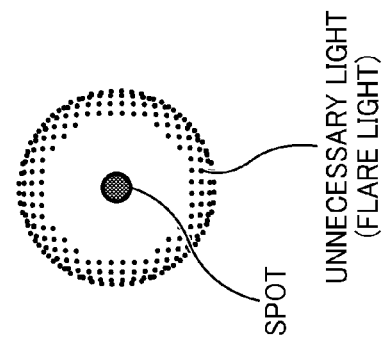
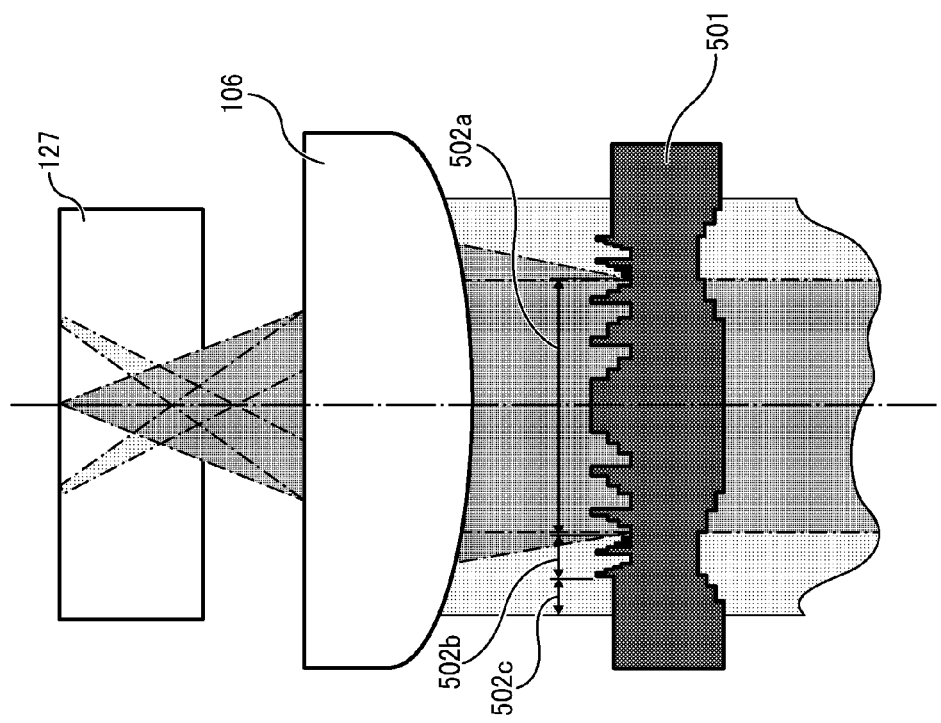
FIG. 10B
FIG. 10A

ABERRATION CORRECTION ELEMENT FOR USE IN READING AND WRITING DATA ON MULTIPLE TYPES OF OPTICAL RECORDING MEDIA

BACKGROUND

1. Technical Field

This disclosure relates to an aberration correction (optical) element that corrects aberration to obtain compatibility for reading and writing data on multiple kinds of optical recording media having different recording density.

2. Discussion of the Background

Optical recording media such as CDs having a storage of 0.65 GB and DVDs having a storage of 4.7 GB have been diffusing as a device to store or save audio visual data or data on computer. In recent years, a further increase in the recording density and storage (data capacity) has been strongly demanded.

Such a demand is satisfied by, for example, increasing the number of numeric apertures (NA) of an objective lens in an optical pickup that reads and writes data on an optical recording medium, or reducing the size of a beam spot focused and formed on an optical recording medium by an objective lens by shortening the wavelength of the light emitted from a light source.

The numeric aperture of the objective lens and the wavelength of the light source for compact discs (CDs) are 0.50 and 780 nm, respectively and those for DVDs having a higher recording density than CDs are 0.65 and 660 nm.

As described above, an optical medium having a higher recording density and a larger data capacity has been demanded these days, meaning that the numeric aperture of an objective lens greater than 0.65 and a light source that emits light having a wavelength shorter than 660 nm are demanded.

The specification of Blu-ray disc (hereinafter referred to as BD) was proposed as an optical recording medium and an optical data processing device for a larger data capacity.

That is an optical recording medium that secures a data capacity corresponding to 22 GB by using an objective lens having a numeric aperture of 0.85 and a light source that emits light having a wavelength in the blue color range.

In addition, an optical pickup that reads and writes data on a high capacity optical recording medium such as a BD is also demanded to secure reading and writing data on existing optical recording media such as CDs and DVDs which have been supplied into the market in large quantity.

Selecting a light source that emits light having a suitable wavelength according to the kind of optical recording medium to be read or written and conducting suitable optical treatment to the selected beams of light to correct spherical aberration caused by the thickness difference among the substrates of optical recording media is preferable.

A technology of using a single optical pickup describes a method and/or a device of using two objective lenses to read and write data on different kinds of optical recording media. Another technology describes a method and/or a device of using a single objective lens for different kinds of optical recording media to reduce the number of parts and size.

Yet another technology describes a method and/or a device of using a diffraction lens to compensate the deterioration of focus light spot formation power to the data recording plane of an optical recording medium caused by a temperature change inside the optical pickup.

However, the first mentioned technology uses two objective lenses, which leads to an increase of the number of parts. This is not preferable in terms of size reduction and cost reduction. Furthermore, the objective lenses are moved and switched according to the kind of the optical recording media, which causes problems such that the mechanism of the actuator is complicated, and the access time on data takes a longer time.

In the second mentioned technology, the objective lens is made of glass. That is, the weight of the objective lens is heavy, which results in heavy burden on the actuator. Furthermore, the objective lens made of glass is difficult to manufacture by injection molding, and is relatively expensive in comparison with an objective lens made of plastic.

When a light and inexpensive plastic objective lens manufactured by injection molding is used, the form and the refraction factor of plastic lens and the oscillation wavelength of the beam of light emitted from the light source vary depending on the temperature change inside the optical pickup. This change causes aberration of the focus spot, which may prevent precise reading and writing.

The third mentioned method and/or a device uses a single objective lens having a phase structure for temperature compensation on the curved surface of the objective lens. However, manufacturing a phase structure on the non-curved surface of an objective lens satisfying an NA of 0.85 for blue wavelength is difficult. In addition, the optical utilization efficiency decreases due to the diffraction structure for use in the temperature compensation mechanism.

An objective lens having no temperature compensation structure is also described but a temperature compensation plane is provided in addition to two aberration correction planes. Thus, the number of parts increases, which is contrary to the idea of the size reduction and cost reduction.

BRIEF SUMMARY

In an aspect of this disclosure, there is provided an aberration correction (optical) element that focuses beams of light on the recording plane of three kinds of the optical recording media with suitable numeric apertures, corrects the spherical aberration caused by temperature changes without a loss of optical utilization efficiency, and stably performs reading and writing data by using a single light and inexpensive plastic objective lens manufactured by injection molding and multiple light sources provided according to the wavelengths in terms of reduction on the number of parts, the size and cost, etc.

In another aspect of this disclosure, there is provided an aberration correction (optical) element that focuses beams of light on the recording plane of three kinds of the optical recording media with suitable numeric apertures, corrects the spherical aberration caused by temperature changes without a loss of optical utilization efficiency, and stably performs reading and writing data by using a single light and inexpensive plastic objective lens manufactured by injection molding and multiple light sources provided according to the wavelength in terms of reduction on the number of parts, the size and cost.

In another aspect, there is provided an aberration correction element comprising: a diffraction plane configured to correct a spherical aberration caused by a difference among a first optical recording medium, a second optical recording medium, and a third recording medium by transmitting first beams of light having a wavelength of λ1 emitted from a first light source to read and write data on the first recording medium comprising a substrate having a thickness of t1, and diffracting second beams of light having a wavelength of λ2 emitted from a second light source to read and write data on the second recording medium comprising a substrate having a thickness of t2, and third beams of light having a wavelength of λ3 emitted from a third light source to read and write data on the third recording medium comprising a substrate having a thickness of t3; and a phase shifter plane comprising a step form having multiple steps along an optical axis direction that is formed in a ring band manner with a step height of a significant multiple integral of wavelengths of λ1, λ2, and λ3 at room temperature, the phase shifter plane generating a spherical aberration −ΔSA having a reverse direction to a spherical aberration ΔSA generated at an objective lens optimized for the first optical recording medium according to a temperature change, wherein the aberration correction element is formed of resin material and satisfies the following relationship 1 and relationship 2:

$$(dn/dT) \times (dh/dT) \times m = \Delta x \quad \text{Relationship 1}$$

$$-3.6 \times 10^{-10} \text{ mm}/^\circ \text{C.}^2 \leq \Delta x \leq -2.1 \times 10^{-10} \text{ mm}/^\circ \text{C.}^2 \quad \text{Relationship 2}$$

where dn/dT has units of [1/° C.] and represents a change in a refraction factor of the resin material based on 1° C., dh/dT has units of [mm/° C.] and represents a change in the step height based on 1° C., m represents a number of the multiple steps and an integer greater than 1, and Δx has units of [mm/° C.$^2$] and represents a value obtained by the relationship 1.

The aforementioned and other aspects, features and advantages will become apparent upon consideration of the following description of the preferred embodiments taken in conjunction with the accompanying drawings.

BRIEF DESCRIPTION OF THE DRAWINGS

Various other objects, features and attendant advantages of the present invention will be more fully appreciated as the same becomes better understood from the detailed description when considered in connection with the accompanying drawings in which like reference characters designate like corresponding parts throughout and wherein:

FIG. 10A is a diagram illustrating beams of light focused on a compact disc, and FIG. 10B is a diagram illustrating a distribution of beams of light formed thereon;

DETAILED DESCRIPTION OF THE INVENTION

The present invention will be described below in detail with reference to several embodiments and accompanying drawings.

Figure 1:
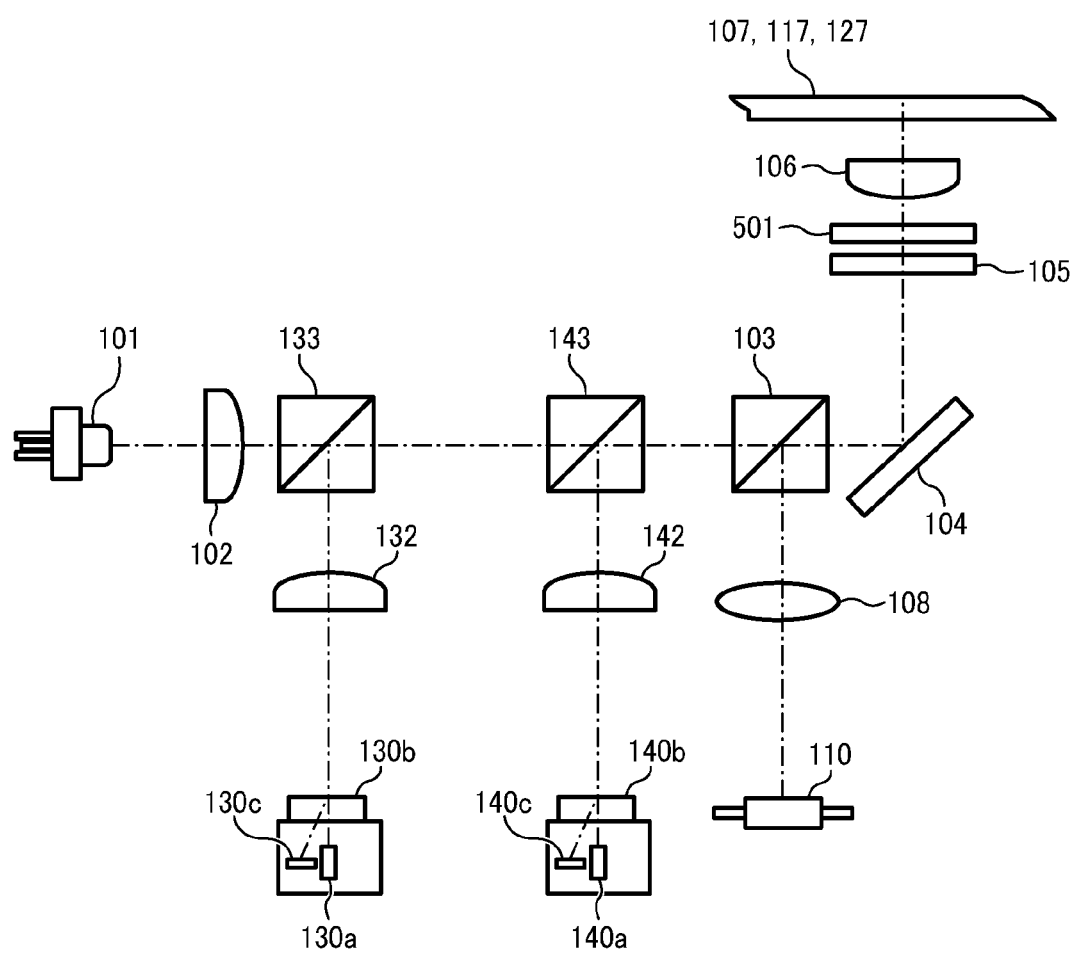
FIG. 1 is a schematic diagram illustrating a structure of an optical pickup for use in an embodiment of the present invention.

FIG. 1 is a diagram illustrating a schematic structure of an optical pickup of an embodiment of the present invention.

As illustrated in FIG. 1, the optical pickup is of a compatible type using a single objective lens 106 in which data are read from and written on three kinds of optical recording media (blu-ray discs, compact discs and digital versatile discs) with different pupil radii using different light source wavelengths.

The substrate thicknesses of a blu-ray disc (BD) 107, a digital versatile disc (DVD) 117, and a compact disc (CD) 127 are 0.1 mm, 0.6 mm and 1.2 mm, respectively.

The numeric apertures thereof are, 0.85, 0.65 and 0.45. The first, second and third light sources emit light having wavelengths of λ1 of 405 nm, λ2 of 660 nm, and λ3 of 785 nm, respectively.

The optical pickup illustrated in FIG. 1 includes a semiconductor 101, a collimate lens 102, a prism 104, a ¼ wavelength board 105, the objective lens 106, a polarization beam splitter 103, a detection lens 108, a light receiving element 110, and an aberration correction device 501.

The center wavelength of the semiconductor 101 functioning as the first light source is 405 nm and the numeric aperture (NA) of the objective lens 106 is 0.85. The substrate thickness of the blu-ray disc 107 is 0.1 mm.

The emission light of the semiconductor laser 101 is turned into significantly parallel light by the collimate lens 102. The light that has passed through the collimate lens 102 enters into the polarization beam splitter 103 followed by deflection at the prism 104. The light is then focused via the ¼ wavelength board 105, the aberration correction device 501 and the objective lens 106. The reflection light from the blu-ray disc 107 passes through the objective lens 106, and the ¼ wavelength board 105 and is separated from the incident light and deflected by the polarization beam splitter 103. Then, the detection lens 108 guides the reflection light to the light receiving element 110 where the play (read) signal, the focus error signal and the track error signal are detected.

In addition, a semiconductor laser 130a emits light having a center wavelength of 660 nm to the digital versatile disc 117. The light passes through a divergence angle conversion lens 132 and a wavelength selective beam splitter 133 and is deflected by the prism 104. The light is then focused on the digital versatile disc 117 via the ¼ wavelength board 105, the aberration correction device 501 and the objective lens 106. The digital versatile disc 117 has a substrate having a thickness of 0.6 mm and the numeric aperture of the objective lens 106 is 0.65. The aberration correction device 501 switches the numeric apertures. The reflection light from the digital versatile disc 117 passes through the objective lens 106, and the ¼ wavelength board 105, and is deflected by the wavelength selective beam splitter 133. Then, a hologram element 130b separates the reflection light from the incident light and guides it to a light receiving element 130c where the play (read) signal, the focus error signal and the track error signal are detected.

In addition, a semiconductor laser 140a emits light having a center wavelength of 785 nm to the compact disc 127. The light passes through a divergence angle conversion lens 142 and a wavelength selective beam splitter 143 and is deflected by the prism 104. The light is then focused on the compact disc 127 via the ¼ wavelength board 105, the aberration correction device 501 and the objective lens 106. The compact disc 127 has a substrate having a thickness of 1.2 mm and the numeric aperture of the objective lens 106 is 0.45. The aberration correction device 501 switches the numeric apertures. The reflection light from the compact disc 127 passes through the objective lens 106, and the ¼ wavelength board 105, and is deflected by the wavelength selective beam splitter 143. Then, a hologram element 140b separates the reflection light from the incident light, and guides it to a light receiving element 140c where the play (read) signal, the focus error signal and the track error signal are detected.

The objective lens 106 is optimally designed to read and write with high accuracy on the blu-ray disc 107 having a thickness of 0.1 mm.

The design wavelength is 405 nm and the wave front aberration at 405 nm is designed to be sufficiently small, i.e., 0.01λ rms or less.

The objective lens 106 in this embodiment is optimally designed for the blu-ray disc 107 having a thickness of 0.1 mm but is not limited thereto.

For example, a two layer blu-ray disc having two data recording planes (layers) has one data recording layer at 0.075 mm, and the other at 0.1 mm relative to the light incident side. Therefore, the objective lens can be optimally designed to have the intermediate value of the two layers; i.e., 0.0875 mm as the design center value.

The objective lens 106 in this embodiment has a double face aspheric form which is represented by the following relationship (i) based on the relationship between the distance x in the optical axis direction of the plane and the radius R in the orthogonal coordinates in which the point of origin is set to be the apex of the plane and the x axis is set to be the optical axis from the light source to the optical recording medium:

$$x = \frac{\frac{1}{r}R^2}{1 + \sqrt{1-(1+\kappa)\frac{1}{r^2}R^2}} + AR^4 + BR^6 + CR^8 +$$

$$DR^{10} + ER^{12} + FR^{14} + GR^{16} + HR^{18} + JR^{20} + \ldots$$

$$R = \sqrt{y^2 + z^2}$$

Relationship (i)

where r represents a paraxial curvature radius, k represents a constant of the cone, A, B, C, D, E, F, G, H, J . . . represent aspheric factors. The plane data of each plane and each area are shown in Table 1.

TABLE 1

| Plane type | | curvature radius (mm) | Distance between planes (mm) | Material |
|---|---|---|---|---|
| First plane | aspheric | 1.1273 | 2.1 | ZEONEX 340R |
| Second plane | aspheric | −1.8362 | | |

| Aspheric coefficient | First plane | Second plane |
|---|---|---|
| κ | −0.6064768 | −55.991970 |
| A | 0.0160514 | 0.0048479 |
| B | −0.0023946 | 0.0892046 |
| C | 0.0019634 | −0.0862992 |
| D | 0.0021548 | 0.0499731 |
| E | −0.0026116 | 0.0210649 |
| F | 0.0004982 | −0.0496325 |
| G | 0.0008154 | −0.0228506 |
| H | −0.0004757 | 0.0578083 |
| J | 0.0000975 | −0.0210895 |

The effective pupil radius of the objective lens 106 is 3.0 mm.

The objective lens 106 is made of a resin (e.g., ZEONEX®, ZEONEX 340R, manufactured by Zeon Corporation).

Figure 2:
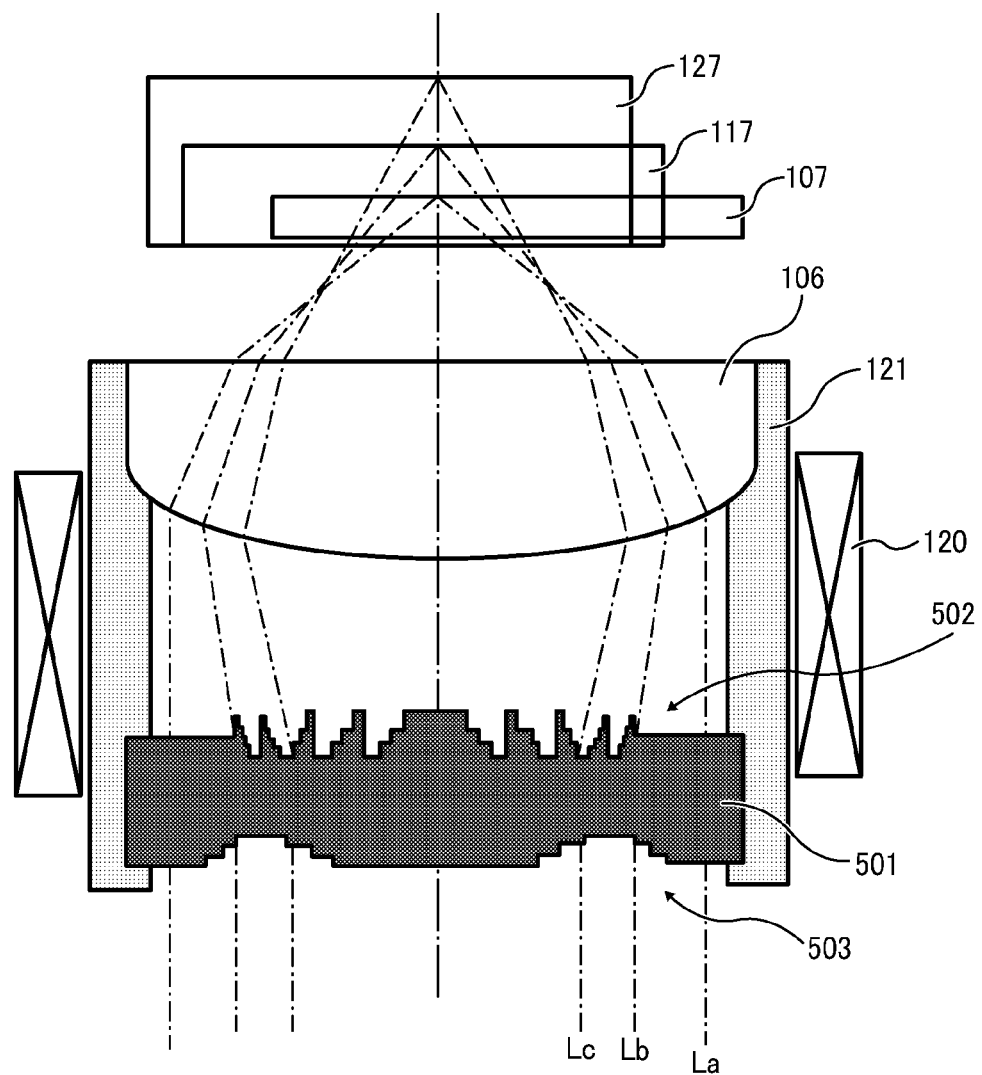
FIG. 2 is an enlarged diagram illustrating the aberration correction device and the objective lens of an embodiment of the present invention.
Figure 3:
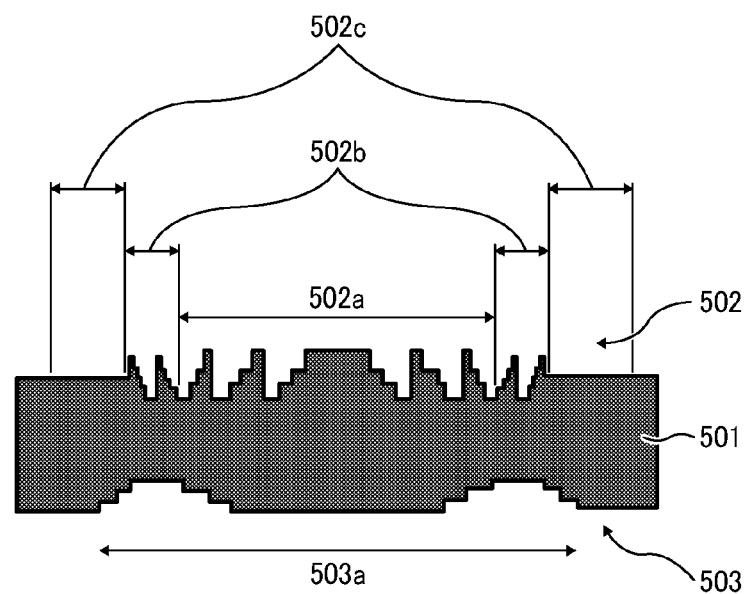
FIG. 3 is an enlarged diagram illustrating the aberration correction device of an embodiment of the present invention.
Figure 4:
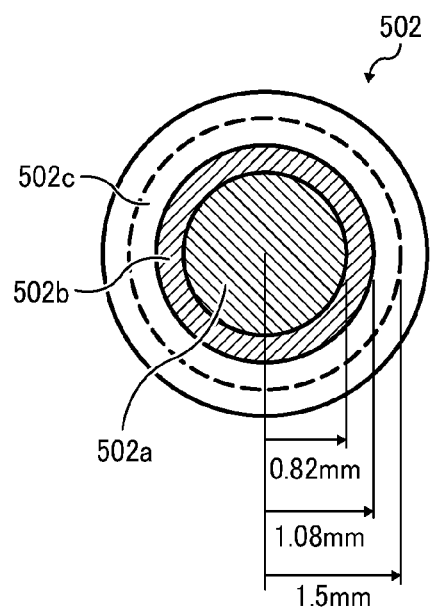
FIG. 4 is a diagram illustrating a diffraction plane of the aberration correction element of an embodiment of the present invention.

FIGS. 2 to 4 are diagrams illustrating the aberration correction device 501 of this embodiment. FIGS. 2 and 3 are enlarged cross sections and FIG. 4 is a diagram illustrating a diffraction plane of the aberration correction element.

One side of the aberration correction device 501 is a compatible element to correct the spherical aberration of light having a center wavelength of 660 nm emitted from the semiconductor laser 130a to the digital versatile disc 117, and light having a center wavelength of 780 nm emitted from the semiconductor laser 140a to the compact disc 127, which is caused by the difference of the substrate thickness of the digital versatile optical disc 117 and the compact disc 127.

Furthermore, the aberration correction device 501 has a function of restricting the aperture to switch the apertures of the objective lens 106 for respective optical recording media.

FIG. 2 is a cross section illustrating a schematic structure of the aberration correction device 501 and the objective lens 106 of this embodiment.

As illustrated in FIG. 2, the aberration correction device 501 and the objective lens 106 are concentrically integrated by a mirror tube 121.

To be specific, the aberration correction device 501 is fixed to one end of the mirror tube 121 having a cylinder form and the objective lens 106 is fixed at the other end thereof. These are coaxially unified along the optical axis.

The objective lens 106 mainly has a lens plane having a form convex toward the inside of the mirror tube 121.

The objective lens 106 moves within the range of about +0.5 mm to about −0.5 mm in the direction perpendicular to the optical axis by the tracking control to read and write data on the blu-ray disc 107, the digital versatile disc 117, and the compact disc 127.

However, when only the objective lens 106 moves while the aberration correction device 501 does not, the aberration occurs, which degrades the focus spot since the digital versatile disc 117 and the compact disc 127 are subject to diffraction by the aberration correction device 501.

Thus, the aberration correction device 501 and the objective lens 106 are integrated to be moved in one by the tracking control to obtain a good focus spot.

In addition, a structure in which a flange is provided to the aberration correction device 501 and/or the objective lens 106 to directly unify them via the flange is also possible.

In this embodiment, the first, second and third beams of light enter into the aberration correction device 501 as parallel light.

That is, the fact that the beams of light are not divergent light or convergent light is advantageous in that decentering of the unified objective lens 106 and the aberration correction device 501 which are unified by the tracking control does not cause coma aberration when reading and writing data on an optical recording medium.

FIG. 3 is a cross section of the aberration correction device of this embodiment.

The aberration correction device 501 includes a diffraction plane 502 having a diffraction structure and a phase shifter plane 503 having a phase step structure.

In FIG. 3, the diffraction plane 502 is provided on the side of the objective lens 106 and, the phase shifter plane 503, on the side of the light source but this positioning can be reversed.

In addition, the diffraction structure and the phase shift structure do not have to be formed on all over the surface of the aberration correction device 501. The aberration correction device 501 may have an area where the diffraction structure and the phase shift structure are not formed.

The diffraction plane 502 is a plane having a perpendicular cross section form with a periodic concavoconvex structure to diffract light according to the wavelength thereof.

The phase shifter plane 503 is a plane having a perpendicular cross section form with a non-periodic concavoconvex structure 503a on which a phase step structure is formed to cause a phase difference due to the optical path difference caused by the concavoconvex structure.

The aberration correction device 501 is made of a resin.

Resins are lighter than glass, easily molding-processed, and suitable for mass-production.

The aberration correction device 501 of this embodiment is installed onto a movable portion 120 of the objective lens 106, and driven together with the objective lens 106 in one. Therefore, the aberration correction device 501 is preferably light in weight.

One of such resins is ZEONEX® (manufactured by Zeon Corporation), which absorbs less moisture and is durable to the blue wavelength.

The diffraction plane 502 is described with reference to FIG. 4 next.

The diffraction plane 502 has three coaxially divided areas in the beam of light range as illustrated in FIG. 4, i.e., a first area 502a (located in the center), a second area 502b (the second area from the center), and a third area 502c (the third area from the center).

The first area 502a is an area having a numeric aperture of 0.45 for the compact disc 127 and has a radius of 0.82 mm in this embodiment.

The first area 502a lets the first beams of light having a wavelength of λ1 (405 nm) pass through and has a diffraction structure of diffracting the second beams of light having a wavelength of λ2 (660 nm) and the third beams of light having a wavelength of λ3 (785 nm) to correct the spherical aberration caused by the difference of the substrate thickness and the wavelength of the digital versatile disc 117 and the compact disc 127.

The second area 502b is an area having a numeric aperture of 0.65 for the digital versatile disc 117 and is situated between a radius of 0.82 mm and a radius of 1.08 mm in this embodiment.

The second area 502b lets the first beams of light having a wavelength of 405 nm pass through and has a diffraction structure of diffracting the second beams of light to correct the spherical aberration caused by the difference of the substrate thickness and the wavelength of the digital versatile disc 117 and of preventing focusing the third beams of light on the recording plane of the compact disc 127.

The third area 502c is an area having a numeric aperture of 0.85 for the blu-ray disc 107 and is situated between a radius of 1.08 mm and a radius of 1.50 mm in this embodiment.

The third area 502c is flat with no diffraction structure in which the first, the second and the third beams of light just pass through. Therefore, the objective lens 106 focuses the first beams of light for the blu-ray disc 107 and does not focus the second and the third beams of light for the digital versatile disc 117 and the compact disc 127.

Therefore, the diffraction plane 502 has a structure of correcting the aberration created for the second and third beams of light and switching the aperture for the digital versatile disc 117 and the compact disc 127 so that good spots are formed on the recording planes thereof.

The aberration correction device 501 corrects aberration by diffracting the incident beams of light that have entered as parallel light in divergent direction.

The aberration created when the divergent light enters into the objective lens 106 and the aberration created by the difference of the substrate thickness and the wavelength have the reverse sign to offset each other.

When the divergent light enters into the objective lens 106, the distance (i.e., working distance) between the objective lens 106 and the optical recording medium is long. This system is advantageous to focus light on an optical recording medium having a thick substrate such as the compact disc 127 by the objective lens 106 when the objective lens 106 has a small diameter and a high numeric aperture.

The cross section of the first area 502a of the aberration correction device 501 is formed of multiple coaxially formed ring band concavoconvex portions as illustrated in FIG. 3. Each ring band convexoconcave portion has a 4-step form. The base step is counted in the 4 steps. The pitch of the ring band concavoconvex portions is gradually narrow toward the outside of the diffraction structure to obtain a lens effect.

The pitch of the ring band concavoconvex portions uses – primary diffraction light for the digital versatile disc 117 and – secondary diffraction light for the compact disc 127 to correct the created corresponding aberrations.

The – primary diffraction light is described with reference to FIG. 5.

Figure 5:
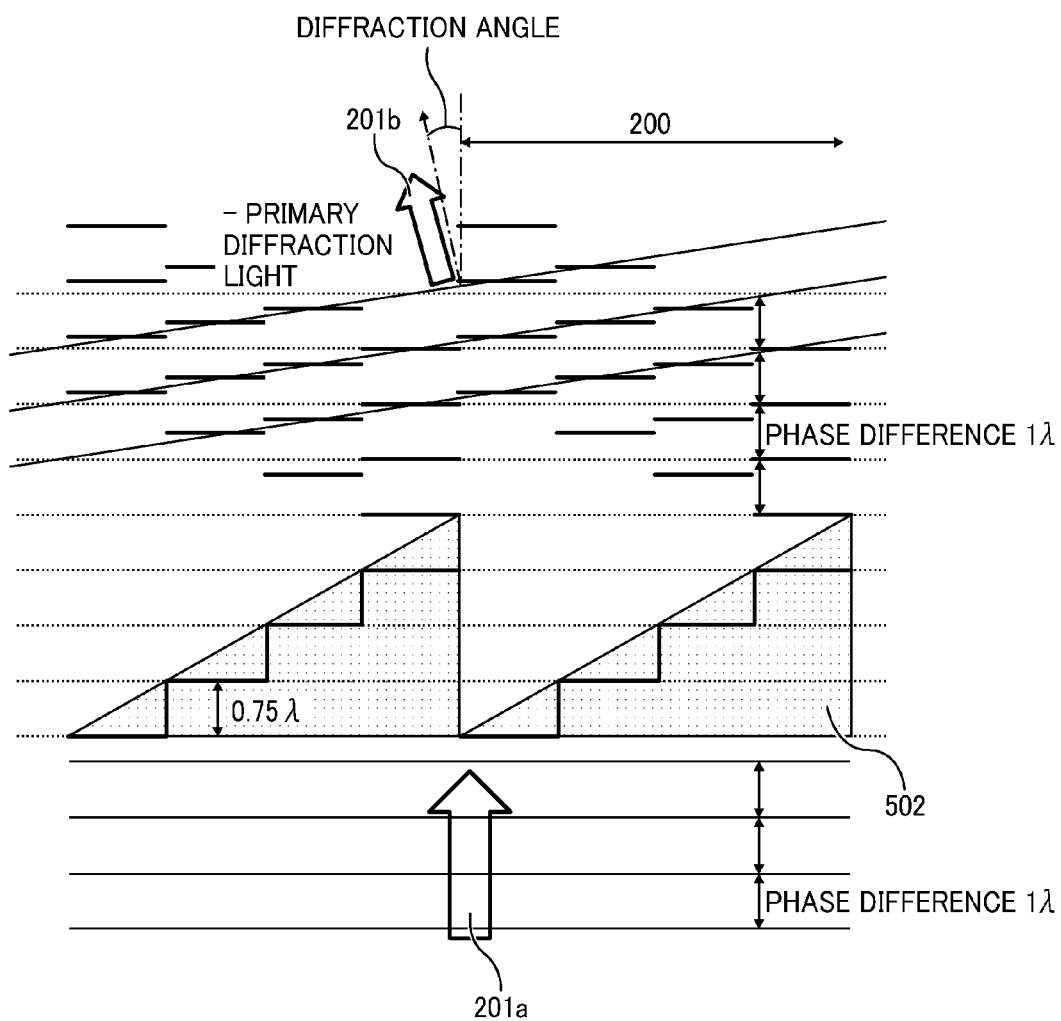
FIG. 5 is a diagram illustrating the status of the wave front of light that enters into a diffraction structure having a 4 step form until the light passes through the diffraction structure as − primary diffraction light.

FIG. 5 is a diagram illustrating the status of wave front when an incident light 201a passes through the 4-step form diffraction structure.

Phase difference occurs to the wave front of the incident light 201a according to the respective step forms when the incident light 201a passes through the 4-step form diffraction structure. Resultantly, the incident light 201a is diffracted as the − primary diffraction light, i.e., an outgoing light 201b. The height of each step form is determined to be a phase difference of 0.75λ.

The − secondary diffraction light is described with reference to FIG. 6.

Figure 6:
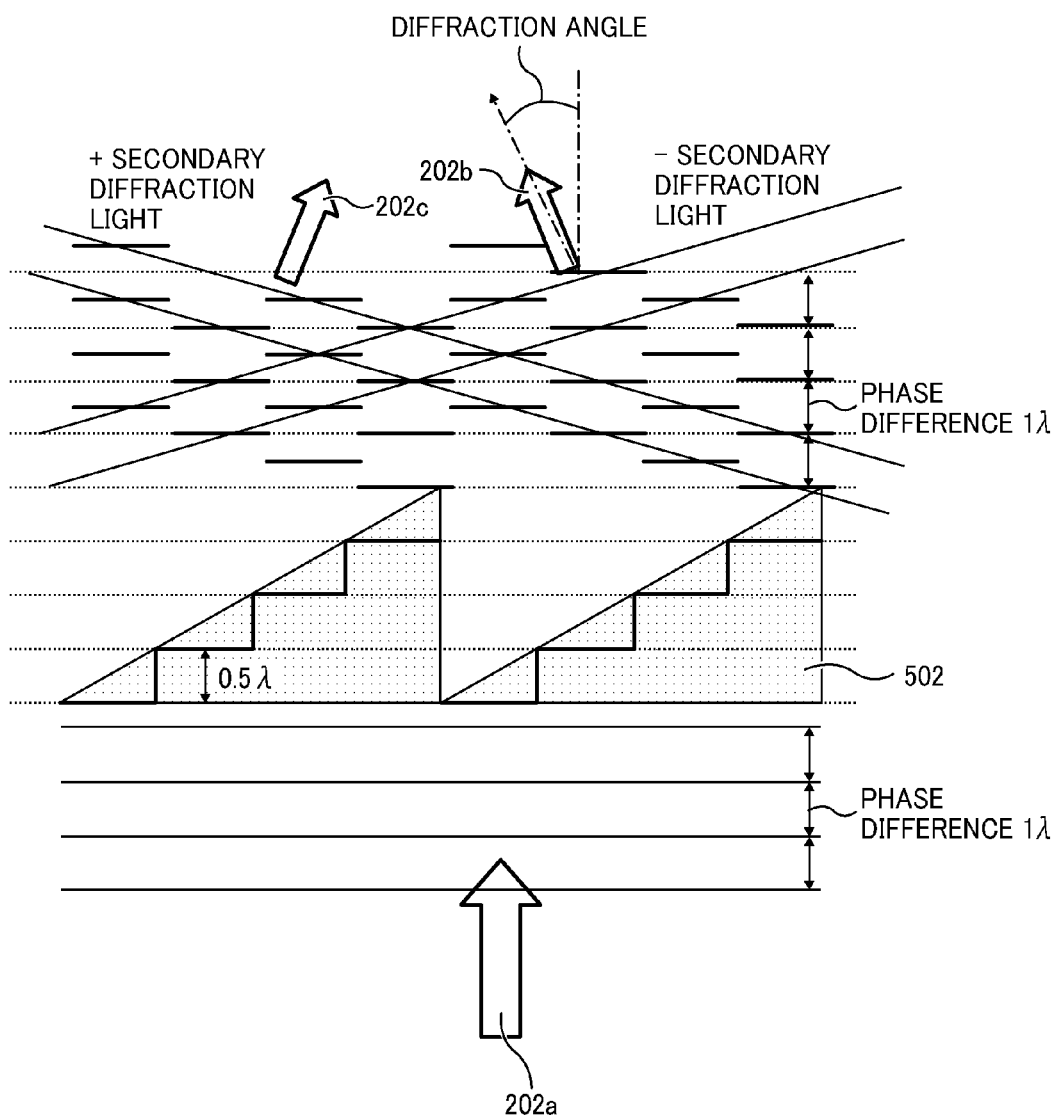
FIG. 6 is a diagram illustrating the status of the wave fronts of light that enter into a diffraction structure having a 4 step form until the light passes through the diffraction structure as + or − secondary diffraction light.

FIG. 6 is a diagram illustrating the status of wave front when an incident light 202a passes through the 4-step form diffraction structure.

Phase difference is created to the wave front of the incident light 202a according to the respective step forms when the incident light 202a passes through the 4-step form diffraction structure. Resultantly, the incident light 202a is diffracted as the − secondary diffraction light, i.e., an outgoing light 202b, and the + secondary diffraction light, i.e., an outgoing light 202c. The height of each step form is determined such that a phase difference of 0.5λ is provided.

The pitch is set in such a manner that the − primary diffraction light is suitably focused on the digital versatile disc 117 and the − secondary diffraction light is suitably focused on the compact disc 127 by the objective lens 106.

The optical path difference function of the diffraction plane 502 is defined as follows:

$$\phi = C_1 R^2 + C_2 R^4 + C_3 R^6 + C_4 R^8 + C_5 R^{10} + C_6 R^{12} + \ldots$$

$$R = \sqrt{y^2 + z^2} \qquad \text{Relationship (ii)}$$

In the relationship (ii), φ is an optical path difference function, R represents a radius (distance from the optical axis), and C1, C2 . . . represent optical path coefficients in the orthogonal coordinates in which the point of origin is the intersection point of the diffraction plane 502 and the optical axis of the optical axis perpendicular plane and the optical axis is set to be X axis. The optical path difference coefficients of the first area 502a are shown in Table 2.

The minimum value of the pitch in the first area 502a is 20 μm and the number of ring bands is 21.

The number of ring bands is the number of one cycles (pitch 200 illustrated in FIG. 5) of the diffraction structure.

TABLE 2

| Manufacturing wavelength Optical path difference function | 660 nm |
|---|---|
| $C_1$ | −2.087E−02 |
| $C_2$ | 1.431E−03 |
| $C_3$ | 1.073E−02 |
| $C_4$ | −5.579E−02 |
| $C_5$ | 9.199E−02 |
| $C_6$ | −6.476E−02 |
| $C_7$ | 1.688E−02 |

As seen in the comparison between FIG. 5 and FIG. 6, a higher absolute degree level (+ or − primary or secondary) of the diffraction light has a larger diffraction angle for the same pitch. With regard to the amount of the spherical aberration occurring to the compact disc 127 and the digital versatile disc 117, the compact disc 127 has a larger amount of the spherical aberration than the digital versatile disc 117. This is because the compact disc 127 has a large substrate thickness difference and wavelength difference.

Therefore, when the degree level of the diffraction light for the compact disc 127 which has a larger amount of aberration correction than the digital versatile disc 117 is set to be larger than that thereof, the aberration can be simultaneously corrected for both of the compact disc 127 and the digital versatile disc 117.

That is, when the degree levels of the diffraction light strongest among the first, second and third beams of light are set to be N11, N12 and N13, the following relationship is necessary to be satisfied: |N11|<|N12|<|N13|.

In this embodiment, N11=0, N12=−1, and N13=−2.

This is because diffraction light having a small degree has a high diffraction efficiency.

The cross section of the second area 502b of the aberration correction device 501 is formed of multiple coaxially formed ring band concavoconvex portions as illustrated in FIG. 3. Each ring band concavoconvex portion has a 5-step form. The pitch of the ring band concavoconvex portions is gradually narrow toward the outside for the diffraction structure to obtain a lens effect.

The pitch of the ring band form concavoconvex portion is set to correct the aberration for the digital versatile disc 117. That is, when the degree levels of the diffraction light strongest among the first and second beams of light are set to be N21 and N22, the following relationship is necessary to be satisfied: |N21|<|N22|.

In this embodiment, N21=0, N22=+1.

Step form groove depths are provided to the second area 502b to prevent the occurrence of − secondary diffraction light so that the second area 502b has a function of restricting apertures for the compact disc 127. The detail is described later.

The minimum value of the pitch in the second area 502b in this embodiment is 17 μm and the number of ring bands is 14.

Next, the height of each step of the diffraction plane 502 is described with reference to FIG. 7.

In the diffraction optical system, the energy of the incident light is converted by an efficiency referred to as the diffraction efficiency.

Figure 7:
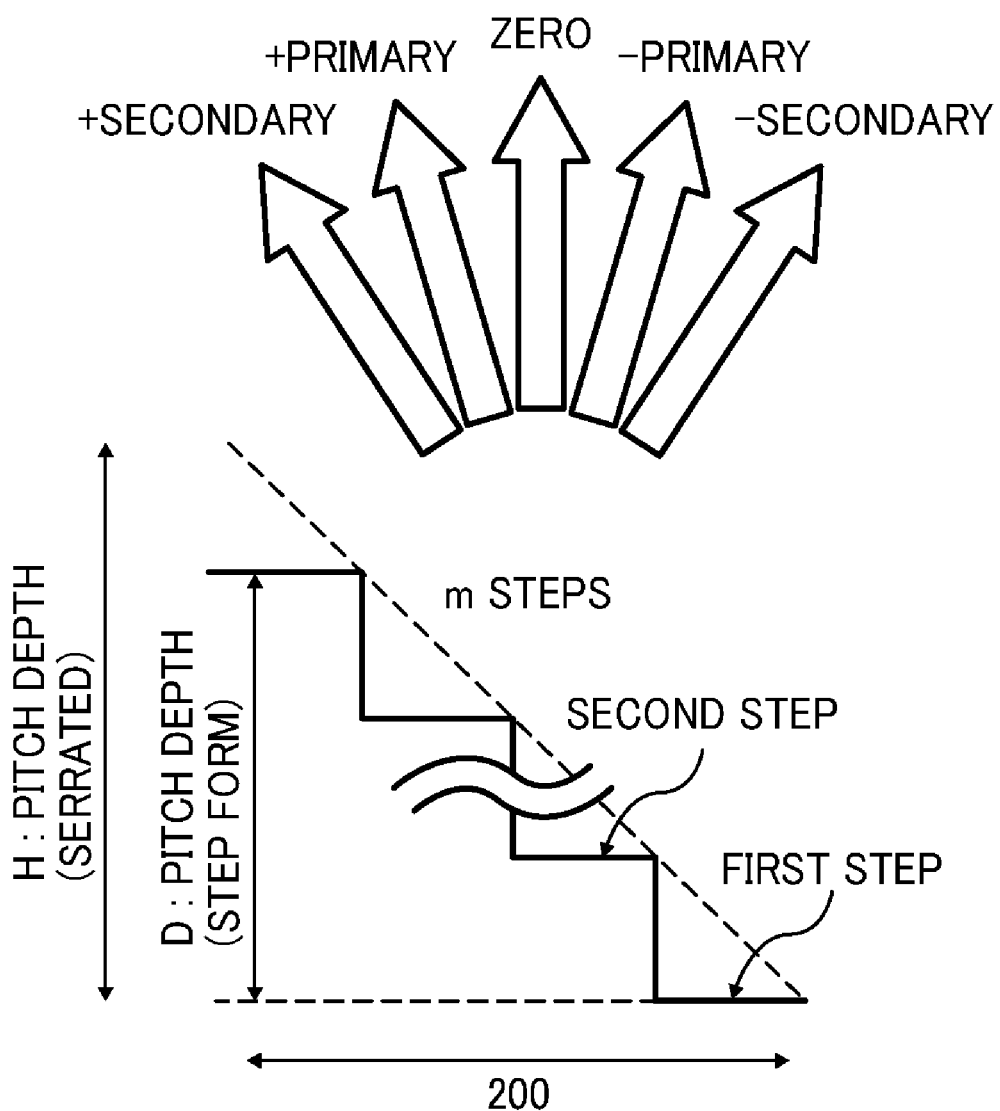
FIG. 7 is a diagram illustrating the height (groove depth) of the diffraction plane.

When Kinoform having a serrated form as illustrated in dotted lines in FIG. 7 is blazed by a certain wavelength, the diffraction efficiency at the wavelength is theoretically 100% in the case of thin approximation.

The diffraction plane 502 is used to obtain zero diffraction light for the first beams of light of 405 nm, and + or − primary or higher diffraction light for the second and the third beams of light of 660 nm and 785 nm and has a step approximation form as illustrated in FIG. 7.

The step form is a form approximated to Kinoform having a serrated form and the inclination direction of the step form is the inclination direction of the serrated form.

In addition, making a step form is easier than an ideal Kinoform.

The zero diffraction light is transmission light that keeps the direction in which the incident light enters.

The first area 502a on the diffraction plane 502 is necessary to satisfy the relationship: |N12|<|N13|, where N12 represents the degree level at which the diffraction efficiency is maximum relative to the second beams of light and N13 represents the degree level at which the diffraction efficiency is maximum relative to the third beams of light. Furthermore, the zero diffraction light is used for the first beams of light. Therefore, the height of the diffraction structure is determined to make the efficiency of the diffraction light for each beam of light great.

As illustrated in FIG. 7 in which D represents the groove depth of the step form, H represents the groove depth of the serrated form and m represents the number of steps of the step form, the phase differences caused by the groove depths which make the diffraction efficiency of the zero diffraction light, + or − primary diffraction light and + or − secondary diffraction light maximum in the case of 4 steps are shown in Table 3.

TABLE 3

| | Four step | |
|---|---|---|
| Dimension (degree) | Phase difference of H | Phase difference of one step |
| Zero | 4λ, 8λ . . . | Nλ |
| −primary | 3λ, 7λ . . . | (0.75 + N) λ |
| +primary | 1λ, 5λ . . . | (0.25 + N) λ |
| + or −secondary | 2λ, 6λ . . . | (0.5 + N) λ |

N is an integer

In addition, the phase differences per step generalized for the case of m steps are shown in Table 4.

The efficiency of a desired diffraction degree is most effectively obtained by setting the height of one step shown in Table 4.

TABLE 4

| Dimension (degree) | Digital blaze Phase difference of one step |
|---|---|
| Zero | mNλ |
| −primary | {(m − 1)/(m + N} λ |
| +primary | {1/m + N}λ |
| −secondary | {(m − 2)/m + N} λ |
| +secondary | {2/m + N} λ |

N is an integer

In the case of 4 steps as in this embodiment, the phase difference corresponding to the amount of one step is set to be an integral multiple N1 of the wavelength for the wavelength of 405 nm of the first beams of light to make the efficiency of the zero diffraction light maximum. The phase difference corresponding to the amount of one step is set to be a sum of 0.75 times of the wavelength and an integral multiple N2 thereof for the wavelength of 660 nm of the second beams of light to make the efficiency of the − primary diffraction light maximum.

Also, a sum of 0.25 of the wavelength and an integral multiple N2 thereof is suitable to make the efficiency of the + primary diffraction light maximum.

The phase difference for one step is set to be a sum of 0.5 times of the wavelength and an integral multiple N3 thereof for the wavelength of 785 nm of the third beams of light to make the efficiency of the + or − secondary diffraction light maximum.

The principle is that the diffraction efficiency is large by determining the height of one step to obtain a desired phase difference according to the number of steps of the diffraction structure as illustrated in FIGS. 5 and 6.

The height and the material are selected to obtain a great efficiency of a desired diffraction light for each beam of light. In a 4 step form, − primary diffraction light and − secondary diffraction light are used for the second beams of light and the third beams of light, respectively.

Figure 8A:
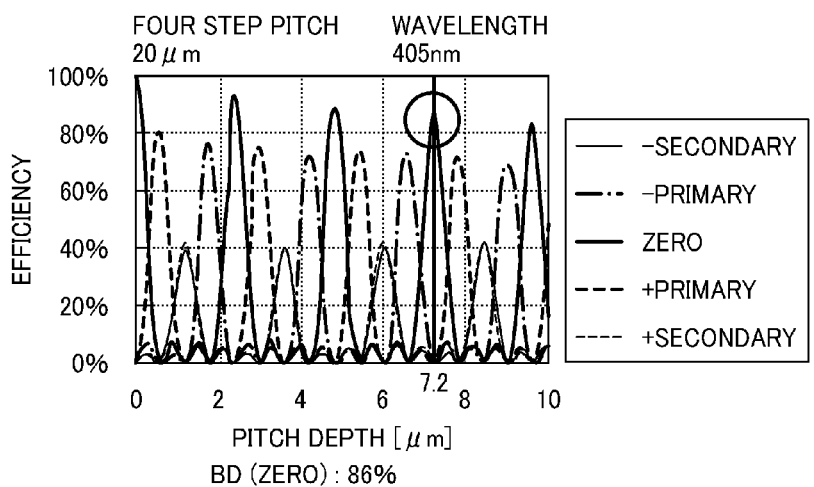
FIG. 8 are group of graphs illustrating the relationship between the groove depth and the diffraction efficiency of a 4 step form of a blu-ray disc in FIG. 8A, a digital versatile disc in FIG. 8B, and a compact disc in FIG. 8C.
Figure 8B:
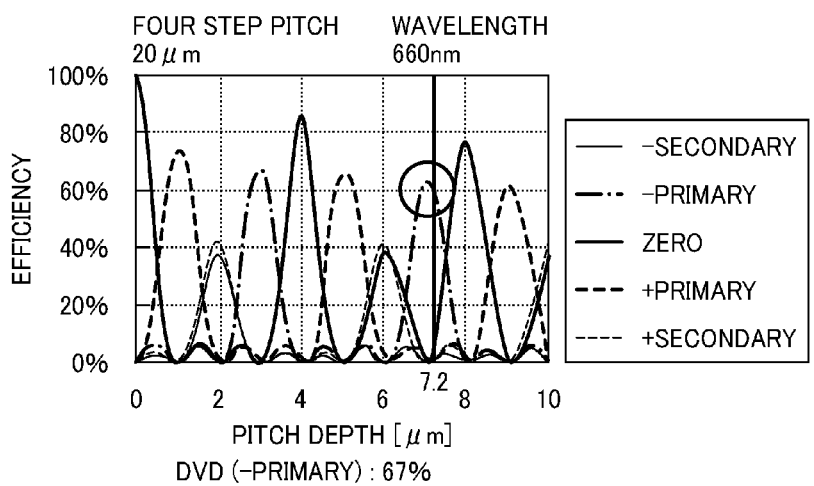
Figure 8C:
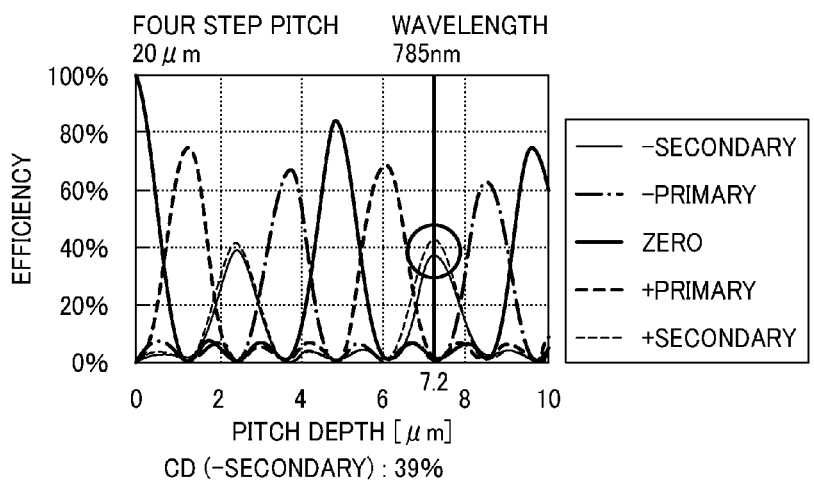

FIGS. 8A, 8B and 8C are graphs illustrating the relationship between the groove depth D of the step form and the diffraction efficiency. FIG. 8A represents the relationship with regard to the first beams of light, FIG. 8B represents the relationship with regard to the second beams of light, and FIG. 8C represents the relationship with regard to the third beams of light. These are the vector calculation results based on Rigorous Coupled Wave Analysis (RCWA) method. The pitch at the time of the efficiency calculation is 20 μm.

When polymethyl methacrylate (PMMA) is used as the material and the groove depth D of all the steps is set to be 7.2 μm, a great efficiency is obtained for any of the wavelengths.

The diffraction efficiencies for the first, the second and the third beams of light are 86%, 67% and 39%, respectively. The groove depth of one step is 2.4 μm when the groove depth D is 7.2 μm.

A phase difference corresponding to an integral multiple of the wavelength for light having a wavelength of 405 nm, a phase difference corresponding to the sum of 0.75 times of the wavelength and an integral multiple thereof for light having a wavelength of 660 nm, and a phase difference corresponding to the sum of 0.5 times of the wavelength and an integral multiple thereof for light having a wavelength of 780 nm are generated at this groove pitch.

As described above, the degrees of the diffraction light satisfying the relationship: |N12|<|N13| with a high diffraction efficiency and also a high diffraction efficiency for zero diffraction light for the first beams of light that transmits the diffraction structure are N12=−1 and N13=−2.

In addition, the second area 502b corrects the aberration for the second beams of light and prevents focusing of the third beams of light on the compact disc 127. For example, the phase differences of the groove depth at which the maximum diffraction efficiency of the zero diffraction light, + or − primary diffraction light, and + or − secondary diffraction light is obtained are shown in Table 5.

TABLE 5

| | Five step | |
|---|---|---|
| Dimension (degree) | Phase difference of H | Phase difference of one step |
| Zero | 5λ, 10λ . . . | Nλ |
| −primary | 4λ, 9λ . . . | (0.8 + N) λ |
| +primary | 1λ, 6λ . . . | (0.2 + N) λ |
| −secondary | 3λ, 8λ . . . | (0.6 + N) λ |
| +secondary | 2λ, 7λ . . . | (0.4 + N) λ |

N is an integer

In the case of 5 steps, the phase difference corresponding to an amount of one step is set to be an integral multiple of the wavelength for the first beams of light having a wavelength of 405 nm to make the efficiency of the zero diffraction light maximum.

The phase difference corresponding to the amount of one step is set to be a sum of 0.2 times of the wavelength and an integral multiple thereof for the second beams of light having a wavelength of 660 nm to make the efficiency of the + primary diffraction light maximum.

The phase difference corresponding to the amount of one step is set to be an integral multiple of the wavelength for the third beams of light having a wavelength of 785 nm not to cause the + or − secondary diffraction light.

Figure 9A:
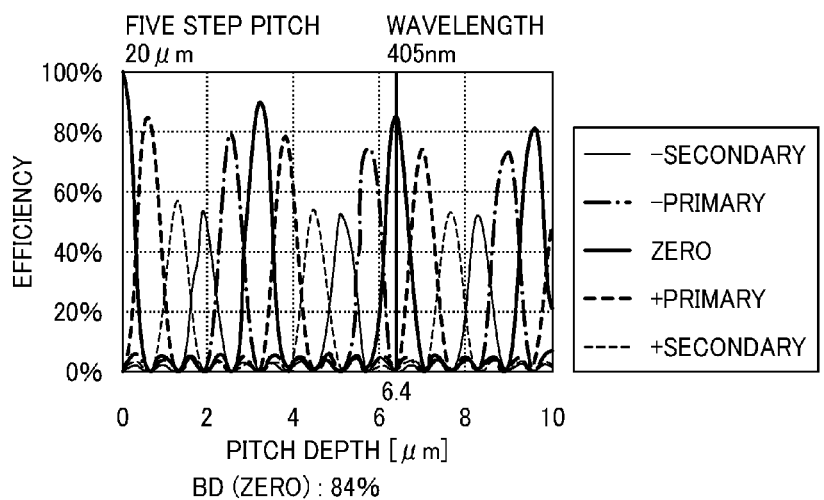
FIG. 9 are group of graphs illustrating the relationship between the groove depth and the diffraction efficiency of a 5 step form of a blu-ray disc in FIG. 9A, a digital versatile disc in FIG. 9B, and a compact disc in FIG. 9C.
Figure 9B:
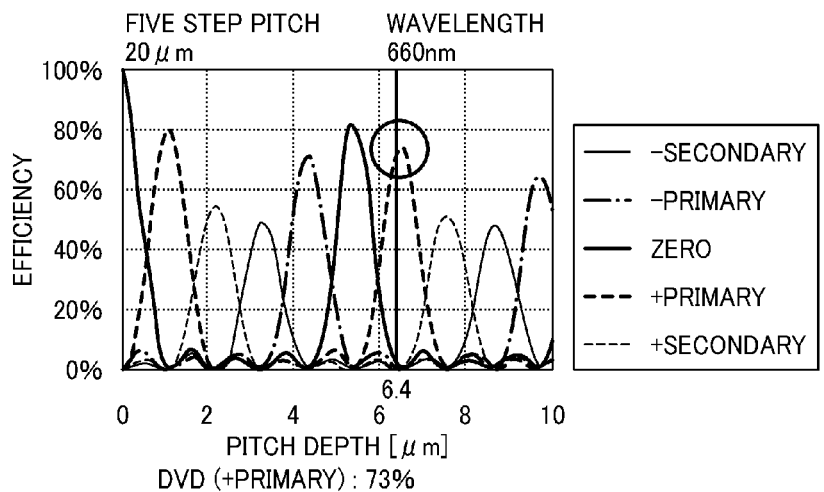
Figure 9C:
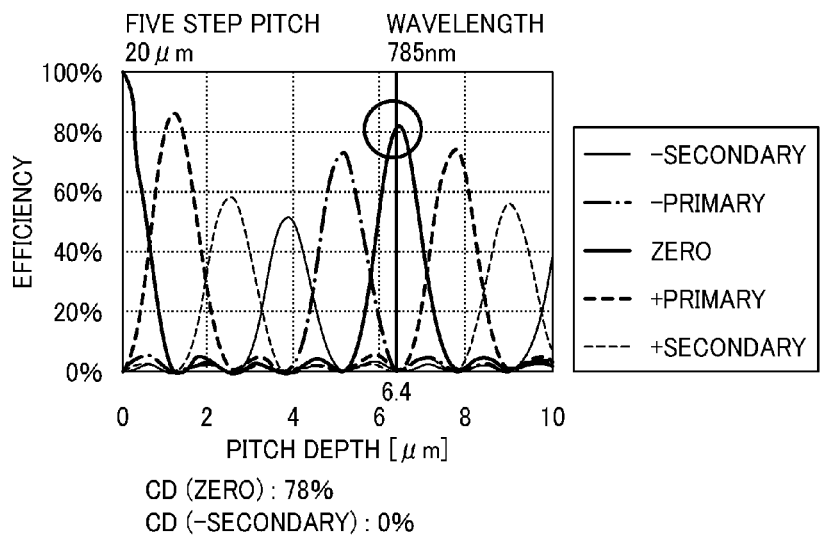

FIGS. 9A, 9B, and 9C are diagrams illustrating the relationship between the groove depth of the step form and the diffraction efficiency and the number of steps is 5. FIG. 9A represents the relationship for the first beams of light, FIG. 9B represents the relationship for the second beams of light, and FIG. 9C represents the relationship for the third beams of light. These are the vector calculation results based on Rigorous Coupled Wave Analysis (RCWA) method. The pitch at the time of the efficiency calculation is 20 μm.

When polymethyl methacrylate (PMMA) is used as the material and the groove depth D of all the steps is set to be 6.4 μm, a great efficiency is obtained for any of the wavelengths. The diffraction efficiency for the zero diffraction light of the first beams of light, the diffraction efficiency for the + primary diffraction light of the second beams of light, and the diffraction efficiency for the − secondary diffraction light of the third beams of light are 84%, 73% and 0%, respectively. Furthermore, the efficiency of the zero diffraction light is good, i.e., 78%, for the third beams of light.

FIG. 10A is a diagram illustrating beams of light focused on the compact disc 127 and FIG. 10B is a diagram illustrating a light beam distribution formed on the compact disc 127.

The beams of light passing through the first area 502a is focused on the compact disc 127 as the − secondary diffraction light.

On the other hand, the beams of light passing through the second area 502b passes through as the zero diffraction light so that the beams of light is not focused on the compact disc 127 and diverges around as flare light, which does not affect reading and writing data on the compact disc 127.

Also, other structures are suitable, for example, a structure in which the groove depth is 4.8 μm (phase difference of one step for the first beams of light:2λ) in the case of 4 steps and PMMA, a structure in which the groove depth is 3.2 μm (phase difference of one step for the first beams of light:2λ) in the case of 3 steps and PMMA, or a structure in which the groove depth is 6.4 μm (phase difference of one step for the first beams of light:4λ) in the case of 3 steps and PMMA.

As illustrated in FIG. 3, the height of the flat portion of the third area 502c is set to be an integral multiple of the wavelength of the first beams of light for the bottom step of the diffraction structure. In this embodiment, the height is set to be 4.0 μm, which corresponds to 5 times of the wavelength.

The beams of light that have passed through the third area 502c are outside the effective diameter for the second and the third beams of light and thus are unnecessary light for spot formation.

As illustrated in FIG. 10B, those beams of light diverge as flare light on the digital versatile disc 117 and the compact disc 127.

On the other hand, the groove depth is set to be an integral multiple of the wavelength of the first beams of light relative to the bottom step of the first area 502a and the second area 502b.

In this embodiment, the height is set to be 4.0 μm, which corresponds to 5 times of the wavelength, but is not limited thereto.

The diffraction efficiency of the diffraction plane of the step form increases as the number of steps increases because the diffraction plane is closer to Kinoform having a serrated form as illustrated in the dot line in FIG. 7. However, a large number of steps narrow the pitch 200 per step. Manufacturing such a step form is difficult. This manufacturing problem leads to manufacturing error which causes deterioration of the efficiency.

In addition, the groove depth D having a shallow depth has a good diffraction efficiency when the pitch 200 is the same.

In addition, the efficiency hardly deteriorates due to the wavelength change or the temperature change. Therefore, a diffraction structure having a shallow groove depth D and a large number of steps is preferable.

In this embodiment, the relationship among the diffraction efficiency of the first, the second and the third beams of light, the concavoconvex form, and the groove depth can be greatly changed by reversing the sign of the degree level of the diffraction light of the first area 502a and a second area 502b.

Therefore, a structure having a shallow groove depth with a large number of steps that functions as an efficient aberration correction device and an aperture restriction element that hardly affects reading and writing data can be provided by a single plane.

In addition, the efficiency of the diffraction plane 502 is known to deteriorate as the pitch narrows. Thus, the efficiency around the portion having a narrow pitch deteriorates.

With regard to the intensity distribution of a light source, the light quantity significantly lowers toward the outer portion in the first area 502a. In addition, the second area 502b has a narrower pitch than the first area 502a. However, since the second area 502b has five steps and a shallower groove depth than the first area 502a in this embodiment, the deterioration of the efficiency is restricted and thus the optical utilization efficiency is improved.

The number of steps and the groove depth are not limited to the above-mentioned. The aperture is easily restricted, which prevents generation of unnecessary light for a spot by reversing the sign of the degree of the diffraction light.

The aberration correction mechanism formed of the diffraction plane 502 described above is used together with the objective lens 106 to correct the spherical aberration caused by the difference of the substrate thickness and wavelength as described above. The spherical aberration ΔSA illustrated in FIG. 11 increases in the case of an objective lens formed of a resin due to the heat discharged from the actuator during operation of the optical pickup device, and the environment temperature change.

This spherical aberration according to the temperature change mainly stems from the refraction index change of the plastic material, inflation and deflation of the lens form, or the wavelength variation of the light source.

For example, when the temperature in the optical pickup rises, the oscillation wavelength of the semiconductor laser shifts on the long wavelength side. The variance is about 0.06 nm/° C. in the case of the light source that emits the first beams of light (λ1=405 nm). In addition, the refraction index of the resin tends to be low due to the wavelength change, and the temperature change. Therefore, the spot focused by the objective lens creates three dimensional spherical aberration.

This spherical aberration increases in proportion to the fourth power of the numeric aperture of an objective lens optical system and thus, causes a significant problem particularly for the blu-ray disc 107 because the numeric aperture thereof is large, i.e., 0.85.

Figure 11:
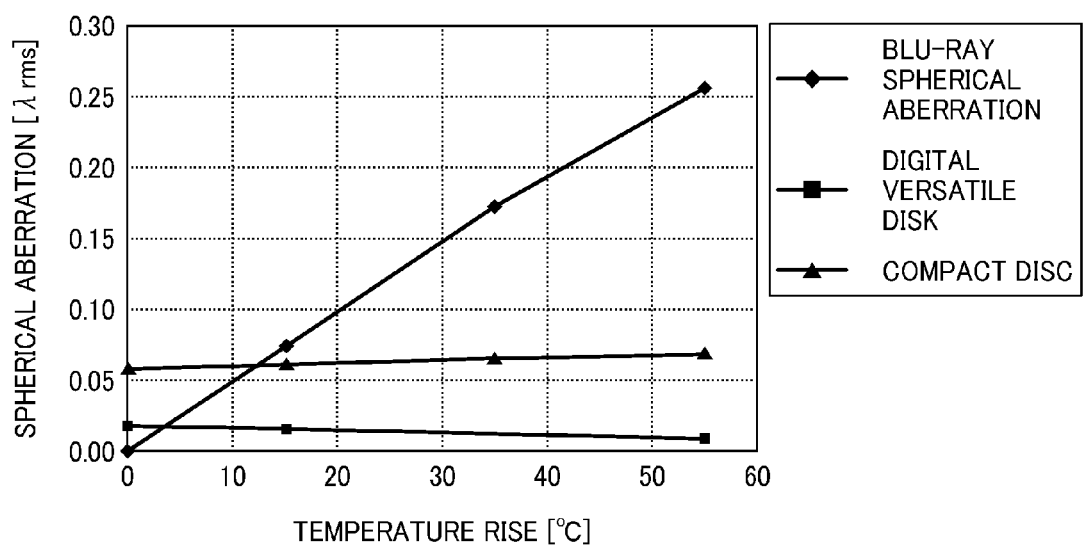
FIG. 11 is a graph illustrating an increase amount of the spherical aberration of a blu-ray disc, a digital versatile disc, and a compact disc depending on the temperature change.

The amount of increase in the spherical aberration of the first, the second, and the third beams of light to the temperature change are shown in FIG. 11. X axis (° C.) of the graph of FIG. 11 represents the temperature change in the optical pickup and Y axis represents the amount of the spherical aberration according to the temperature change. The room temperature is determined to be 25° C.

In the calculation, the variation (dλ/dT) of the oscillation wavelength λ1 according to the temperature change is $6.0 \times 10^{-2}$ (nm/° C.), the variation (dλ/dT) of the oscillation wavelength λ2 and λ3 is $2.0 \times 10^{-1}$ (nm/° C.), and the variation (dn/dT) of the refraction factor is $-1.3 \times 10^{-4}$ (1/° C.). The linear expansion factor of the material is $7.6 \times 10^{-5}$.

The increasing amount in the blu-ray disc is about 0.05λrms/10° C. and relatively large in comparison with the compact disc and the digital versatile disc. With regard to the calculation results of the compact disc and the digital versatile disc, the temperature dependency thereof is calculated in the status in which the spherical aberration is corrected by the diffraction plane described above.

Figure 12:
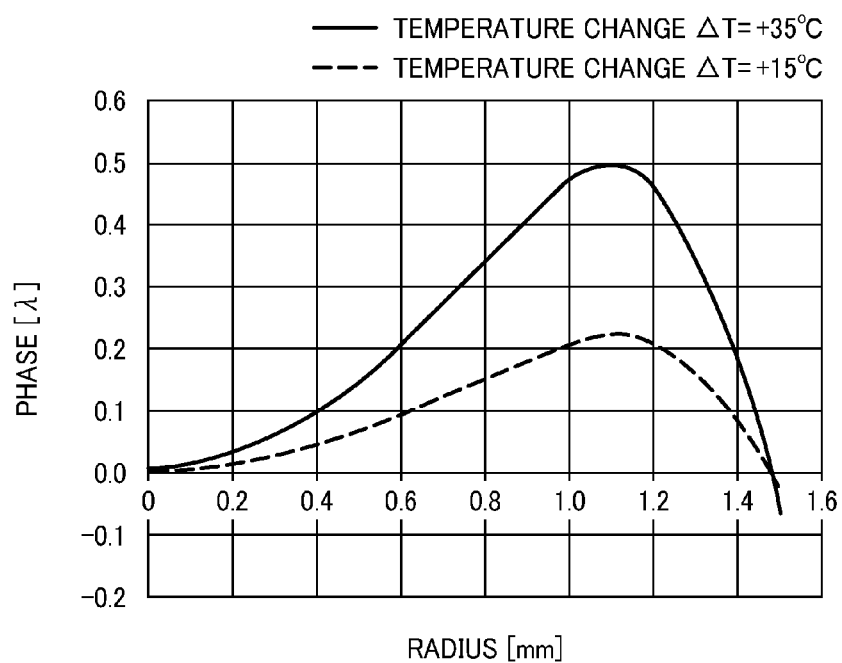
FIG. 12 is a graph illustrating optical path difference aberration characteristics that illustrates phase distribution related to the effective radius position.

FIG. 12 is a graph illustrating the optical path difference (OPD) aberration characteristics representing the phase distribution with regard to the effective radius position.

FIG. 12 is a graph illustrating the optical path difference (OPD) aberration characteristics representing the phase distribution with regard to the effective radium position.

Next, the structure of the phase shifter plane 503 described above is described.

In this embodiment, the phase shifter plane 503 is formed of a resin as in the case of the objective lens and has a refraction factor of 1.525 for the first beams of light (405 nm), 1.507 for the second beams of light (660 nm), and 1.503 for the third beams of light (780 nm).

Figure 13:
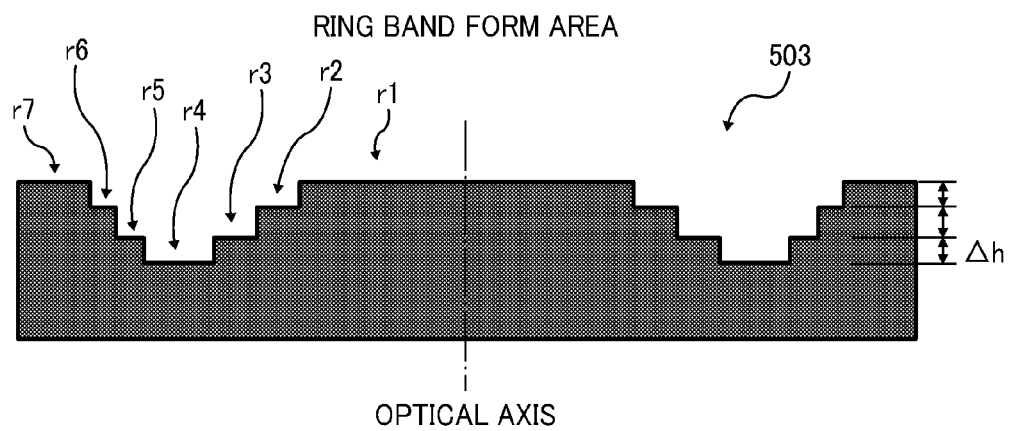
FIG. 13 is a cross section illustrating the phase shifter plane of an embodiment of the present invention.
Figure 14:
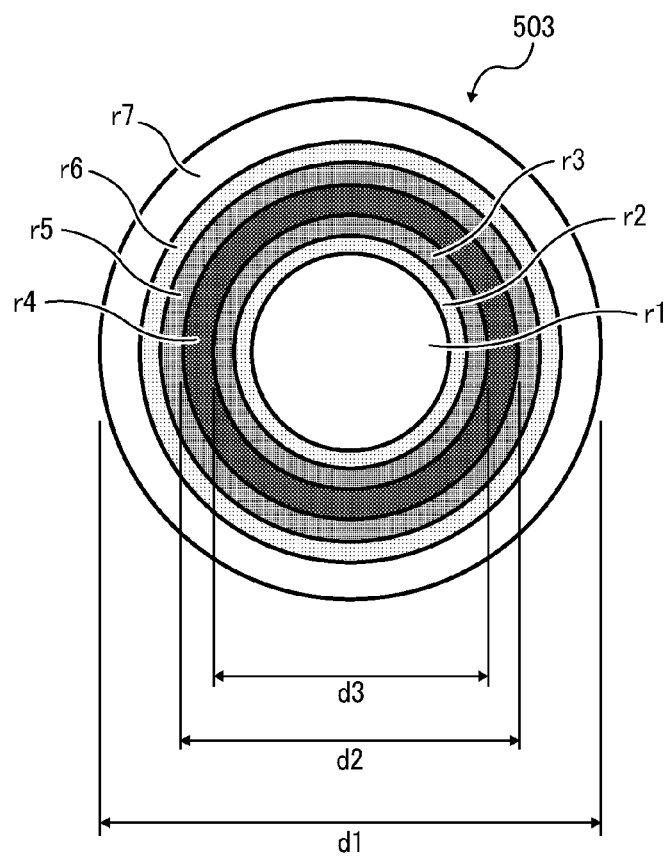
FIG. 14 is a diagram illustrating the phase shifter plane of an embodiment of the present invention.

The phase shifter plane 503 is divided into multiple ring band form areas around the optical axis while each ring band form area is adjacent with each other with a step as illustrated in FIGS. 13 and 14 and is formed on one side of the parallel flat plane. The phase shifter plane 503 is divided into 7 ring band form areas (r1 to r7), and the thickness of the ring band form areas is thinner towards the outer portion (away from the optical axis) until a diameter of d2. The ring band form area is thicker from the position having a diameter of d2 toward the position having a diameter of d1 (away from the optical axis).

In addition, the step at the border between the adjacent two ring band form areas is designed to cause the optical path difference to be an integral multiple of the design wavelength ($\lambda 1$=405 nm in this embodiment) of the objective lens 106 at room temperature.

Simultaneously, the step is also designed to cause the phase path difference to be significantly an integral multiple with regard to $\lambda 2$ and $\lambda 3$.

The size of one step in this embodiment is 9.26 μm.

The distances of the respective steps (r1 to r7) from the optical axis are 0.50 mm, 0.71 mm, 0.90 mm, 1.29 mm, 1.37 mm, 1.42 mm, and 1.5 mm.

d1 corresponds to a diameter for a numeric aperture of 0.85 and d2 corresponds to a diameter for a numeric aperture of 0.65.

In addition, each pair of the ring band forms r3 and r5, the ring band forms r2 and r6, and the ring band forms r1 and r7 forms the same step related to the ring band form area r4.

The size of the step and the distance between each step and the optical axis in the phase shifter plane 503 are not limited to this embodiment and changes depending on the form of the objective lens 106, the design wavelength, material forming the phase shifter plane 503, and the numeric aperture.

In this embodiment, the beams of light from the semiconductor laser 1 as the first light source enters into the phase shifter plane 503 as significantly parallel light La as illustrated in FIG. 2 for the blu-ray disc 107.

The phase shifter plane 503 forms steps that provide a phase difference having an integral multiple of the wavelength $\lambda 1$ of the blu-ray disc 107 and the thickness of each step $\Delta h$ is represented as follows: $k1 \times \lambda 1/(n1-1)$, where k1 is an integer.

In this embodiment, the thickness of each step $\Delta h$ is 12 times of $\lambda 1$ and the height is set to satisfy $\Delta h \{=12 \times 1/(n1-1)$, i.e., 9.26 μm$\}$.

$\lambda 1$ represents a wavelength of 405 nm for the blu-ray disc 107 at room temperature, and n1 is a refraction factor of 1.525 of ZEONEX340R at room temperature for a wavelength of 405 nm.

The ring band form areas r3 and r5 cause an optical path difference of 12 times of $\lambda 1$ related to the ring band form area r4, the ring band form areas r2 and r6, 24 times, and the ring band form areas r1 and r7, 36 times.

Therefore, when the temperature change is small, the phase shifter plane 503 imparts no actual phase difference for the beams of light ($\lambda 1$=405 nm) so that the beams of light just transmits the phase shifter plane 503.

As to the digital versatile disc 117, due to the function of aperture restriction of the diffraction plane 502, significantly parallel light Lb illustrated in FIG. 2 as an example among the second beams of light emitted from the second light source (semiconductor laser 130a) enters into the phase shifter plane 503 and forms a spot on the recording plane of the digital versatile disc 117.

The steps in the ring band form areas (r1 to r4) formed within an area having a diameter of d2 of the phase shifter plane 503 in this embodiment cause the phase difference in the area into which the beams of light Lb enters.

The phase difference added to the second beams of light ($\lambda 2$=660 nm in this embodiment) by the step thickness $\Delta h$ is $7.1 \times \lambda 2$. Therefore, the optical path difference of the ring band form area r3 to the ring band form area r4 is significantly 7 times of $\lambda 2$, the optical path difference of the ring band form area r2 is significantly 14 times, and the optical path difference of the ring band form area r1 is significantly 21 times.

Therefore, the phase shifter plane 503 has only a small impact on the second beams of light and transmission light.

As to the compact disc 127, due to the function of aperture restriction of the diffraction plane 502, significantly parallel light Lc illustrated in FIG. 2 as an example among the third beams of light emitted from the third light source (semiconductor laser 140a) enters into the phase shifter plane 503 and forms a spot on the recording plane of the compact disc 127.

The steps in the ring band form areas (r1 to r3) formed within an area having a diameter of d3 of the phase shifter plane 503 in this embodiment cause the phase difference in the area into which the beams of light Lc enters.

The phase difference added to the third beams of light ($\lambda 3$=785 nm in this embodiment) by the step thickness $\Delta h$ is $5.9 \times \lambda 3$.

Therefore, the optical path difference of the ring band form area r3 to the ring band form area r4 is significantly 6 times of $\lambda 3$, the optical path difference of the ring band form area r2, is significantly 12 times, and the optical path difference of the ring band form area r1, is significantly 18 times.

Therefore, the phase shifter plane 503 has a small impact on the third beams of light and transmission light.

The structure of the phase shifter plane 503 and the phase difference added to the transmission light for the blu-ray disc 107 are shown in Table 6.

TABLE 6

| | Ring band radius position (mm) | Height (mm) | Phase difference ($\lambda$) |
|---|---|---|---|
| r1 | $0.000 \leq r \leq 0.500$ | 0.02777 | 36 |
| r2 | $0.500 \leq r \leq 0.708$ | 0.01851 | 24 |
| r3 | $0.708 \leq r \leq 0.897$ | 0.00926 | 12 |
| r4 | $0.897 \leq r \leq 1.285$ | 0.00000 | 0 |
| r5 | $1.285 \leq r \leq 1.366$ | 0.00926 | 12 |
| r6 | $1.366 \leq r \leq 1.416$ | 0.01851 | 24 |
| r7 | $1.416 \leq r \leq 1.500$ | 0.02777 | 36 |

As described above, each step forms a step h that imparts a phase difference having a significant integral multiple of $\lambda 1$, $\lambda 2$, and $\lambda 3$.

Preferably, the step h is designed to satisfy the following relationships (iii), (iv), and (v):

The phase difference against the oscillation wavelength $\lambda 1$ of the first beams of light at the designated temperature is significantly an integral multiple of $2\pi$ radian.

$$(n1-1) \times h = k1 \times \lambda 1 \qquad \text{Relationship (iii)}$$

In addition, the step h is designed to satisfy the following relationship (iv) with regard to the phase difference against the oscillation wavelength $\lambda 2$ of the second beams of light at the designated temperature:

$$(k2-0.15) \times \lambda 2 \leq (n2-1) \times h \leq (k2+0.15) \times \lambda 2 \qquad \text{Relationship (iv)}$$

In addition, the step h is designed to also satisfy the following relationship (v) with regard to the phase difference against the oscillation wavelength λ3 of the third beams of light at the designated temperature:

$$(k3-0.15) \times \lambda 3 \leq (n3-1) \times h \leq (k3+0.15) \times \lambda 3 \quad \text{Relationship (v)}$$

In the relationships (iii), (iv), and (v), n1, n2, and n3 represent refraction factors of aberration correction optical element material for the wavelengths of λ1, λ2, and λ3, and k1, k2 and k3 represent integers.

Therefore, the phase shifter plane 503 of the aberration correction device 501 practically imparts no phase difference to each wavelength at a constant room temperature environment because the actual phase difference is significantly an integral multiple of the wavelength. Thus, the beams of light just pass through the aberration correction device 501.

Next, the principle of aberration correction with regard to deterioration of the spot characteristics caused by the temperature change in the optical pickup in this embodiment is described with reference to FIG. 15.

When the temperature rises, the oscillation wavelength of the light source shifts on the long wavelength side and the refraction factor of the resin decreases. The step form swells due to the temperature rise, which naturally increases the step size.

This inflation causes the phase difference away from an integral multiple of the wavelength, which creates the wave front aberration for the element transmission light.

The direction of the generated spherical aberration of the objective lens 106 is opposite to that of the phase shifter plane 503 caused by the temperature change. According to this, the spherical aberration −ΔSA is provided which has a reverse phase to that of the objective lens 106 by setting a suitable height of the step form and radius position. Thus, the deterioration of the spot characteristics caused by the temperature change can be reduced.

Figure 15:
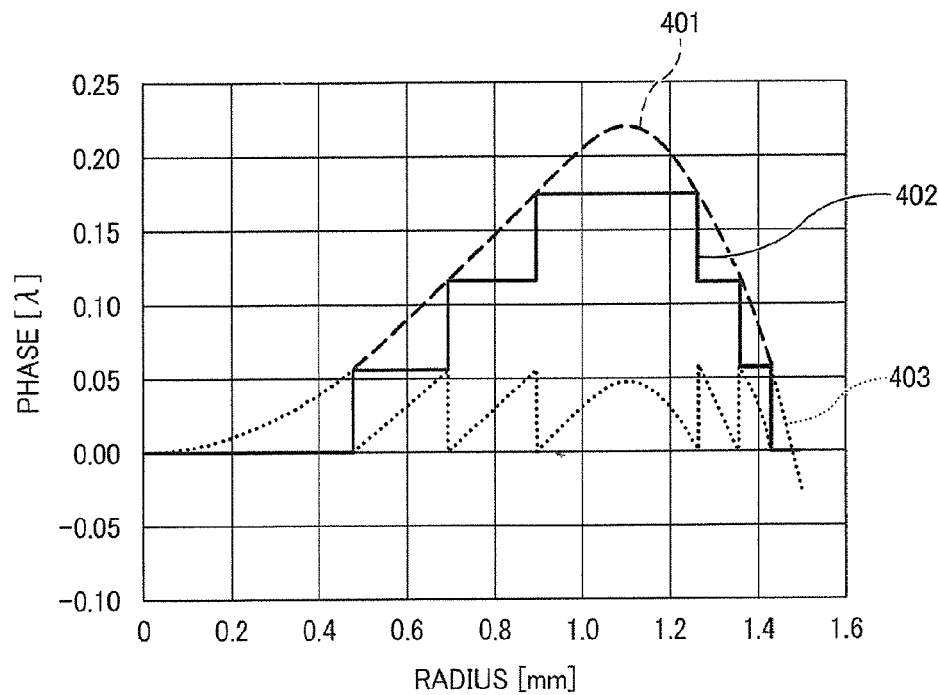
FIG. 15 is a graph illustrating the principle of the aberration correction of an embodiment of the present invention.

FIG. 15 is a diagram illustrating a wave front form of the aberration caused by the environment temperature change. The X axis represents the pupil radius position and the Y axis represents the phase (λ).

As illustrated in FIG. 15, the phase difference approximated to −ΔSA having a step form illustrated by an imparted phase difference 402 is provided to correct the wave front form of a generated aberration 401 indicating ΔSA. As a result, wave fronts advancing or falling behind relative to the optical axis are corrected to a significantly same phase as the phase having the optical axis as the center as illustrated in a residual aberration 403.

The material characteristics of the phase shifter plane 503 and the phase step form are suitably designed to obtain a suitable amount of the spherical aberration by the phase shifter plane 503.

The amount of generated phase difference imparted by the phase difference (step) is represented by the value ΔX obtained by the following numerical expression:

$$\left(\frac{dn}{dT}\right) \times \left(\frac{dh}{dT}\right) \times m$$

In the numerical expression, dλ/dT represents the variation of the oscillation wavelength of the light source caused by the temperature change, and dn/dT represents the variation of the refraction factor of the aberration correction element. In addition, the inflation ratio of the step h along the optical axis direction of the phase shifter plane and the number of steps is m.

A suitable amount of the spherical aberration is caused at the phase shifter plane when the following relationships (1) and (2) are satisfied, and as a result the recording plane spot is suitably focused for the blu-ray disc 107.

$$(dn/dT) \times (dh/dT) \times m = \Delta x \quad \text{Relationship (1)}$$

$$-3.6 \times 10^{-10} \text{ mm/}^\circ C.^2 \leq \Delta x \leq -2.1 \times 10^{-10} \text{ mm/}^\circ C.^2 \quad \text{Relationship (2)}$$

In Relationship (1) and Relationship (2), dn/dT has units of [1/° C.] and represents a change in a refraction factor of the resin material based on 1° C., dh/dT has units of [mm/° C.] and represents a change in the step height based on 1° C., m represents a number of the multiple steps and an integer greater than 1, and Δx has units of [mm/° C.$^2$] and represents a value obtained by the relationship 1.

Figure 16:
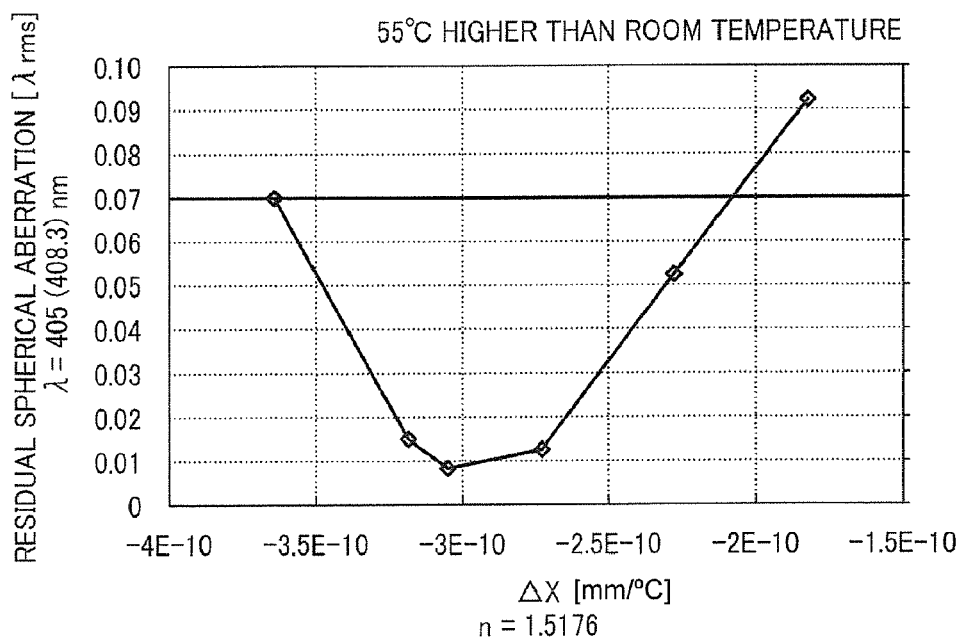
FIG. 16 is a graph illustrating an amount of the spherical aberration after correction to a generated amount ΔX when the temperature rises in an amount of 55° C.

FIG. 16 is a graph illustrating the amount of the spherical aberration to the generated amount ΔX after correction when the amount of temperature rise is 55° C. This temperature rise of 55° C. is considered to be sufficient to cover the actual temperature rise inside the pickup.

When the relationship 2 is satisfied, the spherical aberration is not greater than 0.07 λrms.

Figure 17:
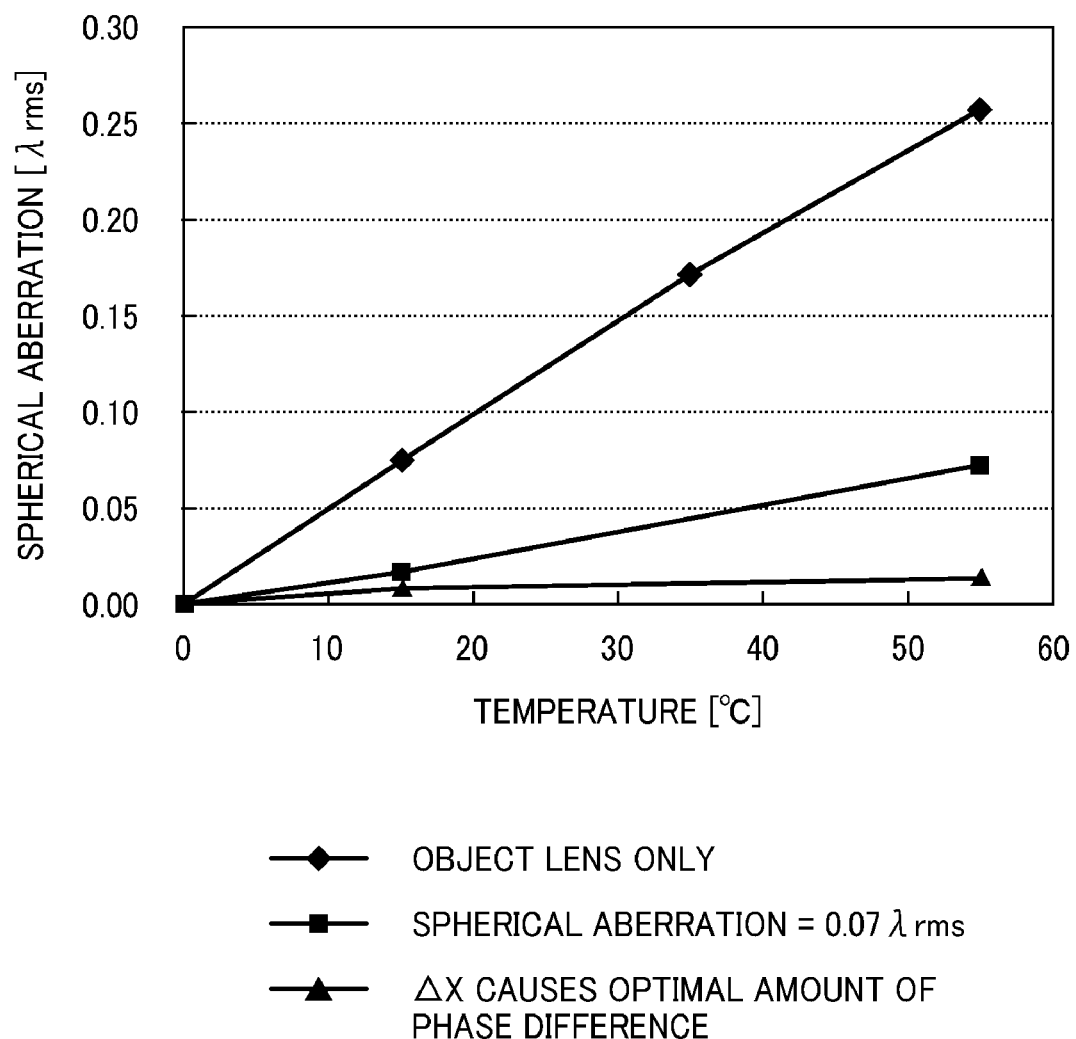
FIG. 17 is a graph illustrating an increase amount ΔSA of the spherical aberration after correction related to temperature change.

In addition, FIG. 17 is a graph illustrating an increase amount ΔSA of the spherical aberration after correction with regard to the temperature change.

The temperature characteristics when just the objective lens is used, the temperature characteristics when ΔX illustrated in FIG. 16 causes an optimal amount of the phase difference, and the temperature characteristics when the spherical aberration is 0.07 λrms, are shown in FIG. 17.

As seen in the graph, the increase amount ΔSA of the spherical aberration caused by the temperature change can be reduced. The increase amount ΔSA can be reduced to less than a half when compared with the case in which just the objective lens is used as long as the range described above is satisfied.

In this embodiment, the phase shifter plane 503 has a three step form as illustrated in FIG. 13 for the blu-ray disc 107.

In this structure, the variation of the oscillation wavelength of the light source caused by the temperature change (dλ/dT) is 0.06 nm/° C., the variation of the refraction factor (dn/dT) of the aberration correction element 501 is −1.3×10$^{-4}$.

The wavelength (λ1=405 nm) of the first light source is 408.3 (=405+3.3) nm when the temperature is 80° C. as a result of the temperature rise of 55° C. from 25° C. (reference temperature). The refraction factor of the aberration correction element 501 is 1.5176. The thickness Δh of the phase difference (step) swells to 9.30 μm.

This inflation causes the optical path length away from an integral multiple of the wavelength, which creates the phase difference for the element transmission light. The ring band form areas r3 and r5 cause a phase difference of 0.21λ to the ring band form area r4, the ring band form areas r2 and r6, −0.43λ, and the ring band form areas r1 and r7, −0.64λ.

The phase behind the wave front passing through the ring band form area r4 is represented by + and the phase ahead of the wave front passing through the ring band form area r4 is represented by −.

With regard to the compact disc 127, and the digital versatile disc 117, the increase amount of the spherical aberration caused by the temperature change is small in the spot in which the spherical aberration is corrected by the diffraction plane 502 described above.

Thus, the phase shifter plane 503 has only a limited impact when the temperature changes.

Figure 18:
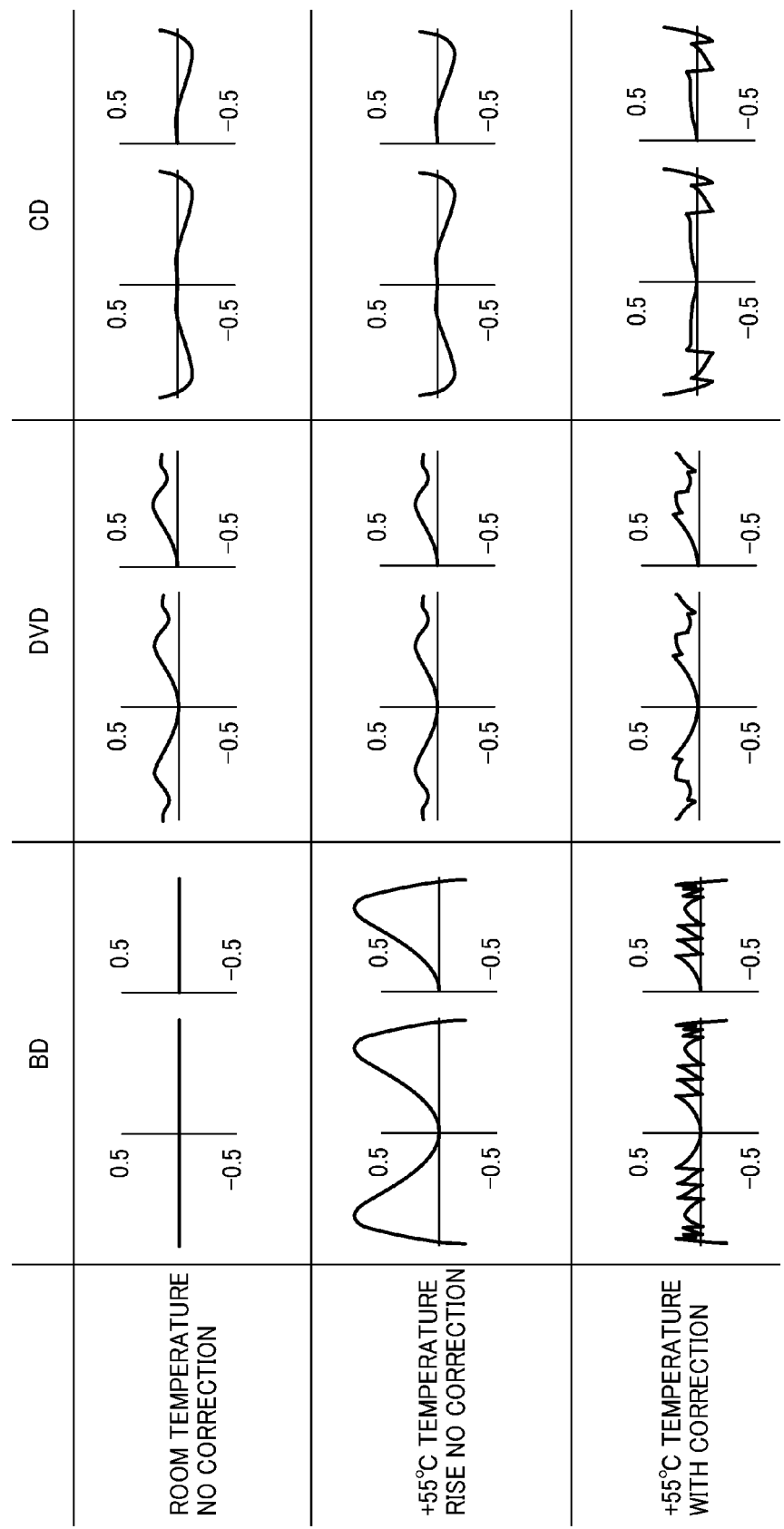
FIG. 18 is a group of graphs illustrating corresponding wave front aberration of a blu-ray disc, a digital versatile disc, and a compact disc at room temperature and a temperature 55° C. higher than room temperature.

FIG. 18 is a group of graphs illustrating each spot wave front aberration of the blu-ray disc 107, the digital versatile disc 117, and the compact disc 127 at room temperature and a temperature 55° C. higher than the room temperature.

In FIG. 18, wave front forms of the spot on the recording plane are illustrated. The X axis represent the pupil radius position and the Y axis represents the phase (λ).

The wave front aberrations illustrated in FIG. 18 are, the wave front aberration for just a diffraction structure at room temperature, the wave front aberration for just a diffraction structure at a temperature 55° C. higher than the room temperature, and the wave front aberration for a structure including both the diffraction structure and the phase shifter structure at a temperature 55° C. higher than the room temperature.

The phase difference generated for the compact disc 127, and the digital versatile disc 117, are residual aberration of the diffraction plane.

The spherical aberration is found to be suitably offset by the phase shifter plane with regard to the blu-ray disc 107.

With regard to the digital versatile disc 117 and the compact disc 127, the spherical aberration is not caused by the phase shifter plane having a step form satisfying the relationships (iii), (iv), and (v) described above.

A slight phase difference caused by the phase difference (step) is seen in FIG. 18. However, the wave front that discontinuously shifts by the steps hardly contributes to the spot performance. In addition, the increase of the spherical aberration can be restrained to a slight level.

The size of the step and the distance between each step and the optical axis in the phase shifter plane 503 are not limited to this embodiment and change depending on the form of the objective lens 106, the design wavelength, material forming the phase shifter plane 503, and the numeric aperture.

In addition, the residual aberration of the diffraction plane 502 at room temperature can be reduced by suitably designing the step form of the phase shifter plane 503.

Figure 19:
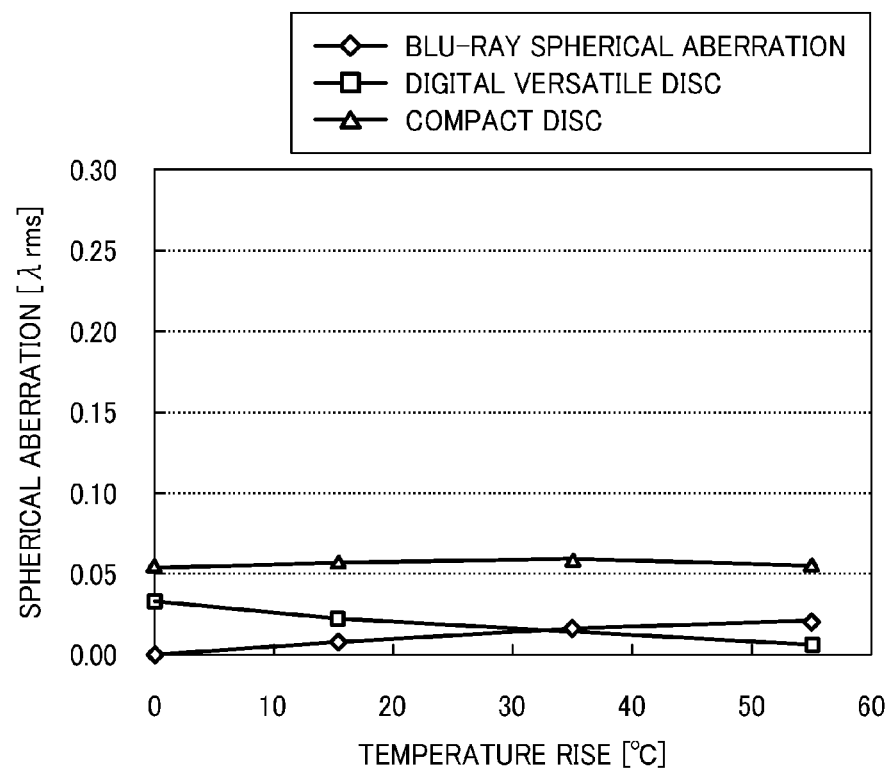
FIG. 19 is a graph illustrating a correction effect with regard to temperature characteristics by a phase shifter plane.

FIG. 19 is a graph illustrating the correction effect of the temperature characteristics by the phase shifter plane in the embodiment described above.

ΔT (° C.) of the graph represents the amount of temperature change from the room temperature, and the Y axis represents the amount of the spherical aberration according to the temperature change.

Next, a case in which the optical axis shift of the aberration correction element occurs related to the optical axis of the optical lens is described.

Figure 20:
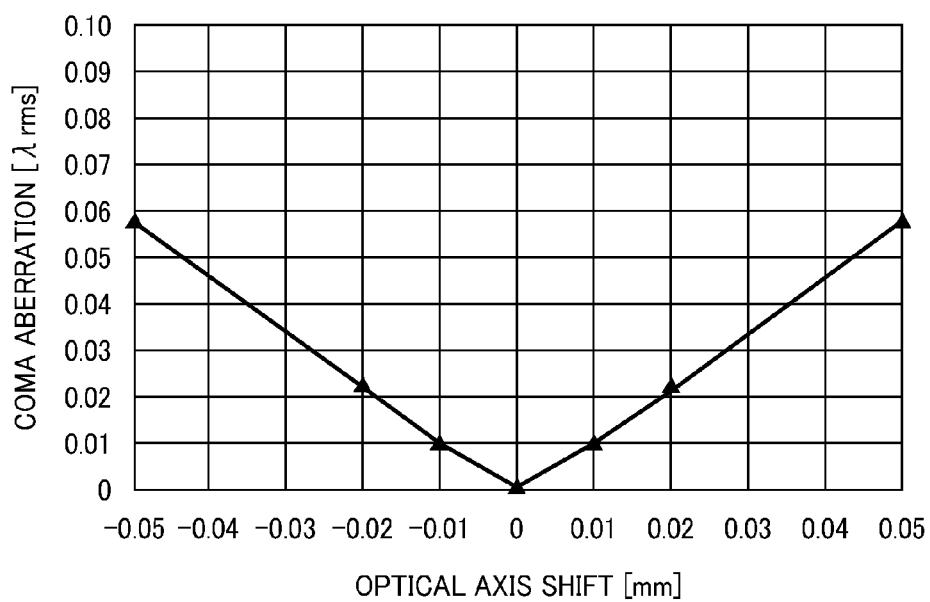
FIG. 20 is a graph illustrating a coma aberration caused by optical axis shift.

The coma aberration illustrated in FIG. 20 occurs according to the optical axis shift for the digital versatile disc 117 and the compact disc 127 that diverge light by the diffraction plane.

Generally, optical axis shift adjustment assembly is performed using this coma aberration as an indicator. For example, the optimal assembly point is determined by observing a spot where the light is focused on the recording plane of the digital versatile disc 117 with, for example, a microscope lens to minimize the coma aberration occurring to the spot.

The coma aberration as described above does not occur to the phase shifter plane which transmits light at room temperature and causes a phase difference at temperature change. Therefore, an aberration that indicates the optical axis shift is difficult to determine. A restriction with regard to designing such that a large assembly tolerance is required should be considered for a single temperature correction phase shifter plane.

However, since a compatible diffraction plane is integrated as described in this embodiment, a typical adjustment and assembly method can be employed, thereby relaxing the impact of the issue in terms of manufacturing.

As described above, the optical pickup including the aberration correction element of the present invention maintains a suitable wave front by the aberration correction element when the form of the objective lens and the refraction factor are caused to change or when the wavelength of beams of light emitted from the light source varies due to the temperature change inside the optical pickup. As a result, the present invention provides an aberration correction element, which is preferably used for a high precision optical pickup that has a great tolerance to the wavelength variation.

Furthermore, in the present invention, a single plastic objective lens forms a good optical spot on the recording plane of any of the blu-ray disc 107, the digital versatile disc 117, and the compact disc 127, which leads to the size reduction and cost reduction of the device.

This document claims priority and contains subject matter related to Japanese Patent Application No. 2008-228188, filed on Sep. 5, 2008, the entire contents of which are incorporated herein by reference.

Having now fully described the invention, it will be apparent to one of ordinary skill in the art that many changes and modifications can be made thereto without departing from the spirit and scope of the invention as set forth therein.

What is claimed as new and desired to be secured by Letters Patent of the United States is:

1. An aberration correction element comprising:
a diffraction plane configured to correct a spherical aberration caused by a difference among a first optical recording medium, a second optical recording medium, and a third recording medium by transmitting first beams of light having a wavelength of $\lambda 1$ emitted from a first light source to read and write data on the first recording medium comprising a substrate having a thickness of t1, and diffracting second beams of light having a wavelength of $\lambda 2$ emitted from a second light source to read and write data on the second recording medium comprising a substrate having a thickness of t2, and third beams of light having a wavelength of $\lambda 3$ emitted from a third light source to read and write data on the third recording medium comprising a substrate having a thickness of t3; and
a phase shifter plane comprising a step form having multiple steps along an optical axis direction that is formed in a ring band manner with a step height of a significant multiple integral of each of wavelengths of $\lambda 1$, $\lambda 2$, and $\lambda 3$ at room temperature, the phase shifter plane generating a spherical aberration $-\Delta SA$ having a reverse direction to a spherical aberration $\Delta SA$ generated at an objective lens optimized for the first optical recording medium according to a temperature change,
wherein in the phase shifter plane, thickness of the step form in the optical axis direction becomes smaller in a radial direction from the optical axis toward an outer portion of the phase shifter plane to a first radial position that is a predetermined distance away from the optical axis, and then becomes greater from the first radial position to the outer portion of the phase shifter plane, and wherein the aberration correction element is formed of resin material and configured to satisfy the following relationships 1 and 2:

$$(dn/dT) \times (dh/dT) \times m = \Delta x \quad \text{Relationship 1}$$

$$-3.6 \times 10^{-10} \text{ mm/}°\text{C.}^2 \leq \Delta x \leq -2.1 \times 10^{-10} \text{ mm/}°\text{C.}^2 \quad \text{Relationship 2}$$

where dn/dT has units of [1/°C.] and represents a change in a refraction factor of the resin material based on 1°C., dh/dT has units of [mm/°C.] and represents a change in the step height based on 1°C., m represents a number of the multiple steps and an integer greater than 1, and $\Delta x$ has units of [mm/°C.$^2$] and represents a value obtained by the relationship 1.

* * * * *